(12) United States Patent
Gaj et al.

(10) Patent No.: US 9,786,455 B2
(45) Date of Patent: Oct. 10, 2017

(54) ACTUATOR DEVICE WITH STABLE WORKING POSITIONS

(71) Applicant: ELTEK S.P.A., Casale Monferrato (AL) (IT)

(72) Inventors: Renato Gaj, Casale Monferrato (IT); Costanzo Gadini, Frassineto Po (IT)

(73) Assignee: ELTEK S.P.A., Casale Monferrato (AL) (IT)

( * ) Notice: Subject to any disclaimer, the term of this patent is extended or adjusted under 35 U.S.C. 154(b) by 261 days.

(21) Appl. No.: 14/225,193

(22) Filed: Mar. 25, 2014

(65) Prior Publication Data

US 2014/0292473 A1 Oct. 2, 2014

(30) Foreign Application Priority Data

Mar. 27, 2013 (IT) .............................. TO2013A0255

(51) Int. Cl.
*H01H 37/12* (2006.01)
*F03G 7/06* (2006.01)

(52) U.S. Cl.
CPC ............... *H01H 37/12* (2013.01); *F03G 7/06* (2013.01); *F03G 7/065* (2013.01)

(58) Field of Classification Search
CPC ............ H01H 37/12; F03G 7/06; F03G 7/065
USPC ................................................ 337/126, 384
See application file for complete search history.

(56) References Cited

U.S. PATENT DOCUMENTS

| 3,585,868 | A | * | 6/1971 | Scott | ..................... | F16H 25/186 74/424.9 |
| 5,760,672 | A | * | 6/1998 | Wang | ..................... | H01H 71/62 337/66 |
| 6,072,381 | A | * | 6/2000 | Yu | ......................... | H01H 23/003 337/112 |
| 6,275,134 | B1 | * | 8/2001 | Chen | ..................... | H01H 73/26 337/37 |
| 6,445,273 | B1 | * | 9/2002 | Yu | ......................... | H01H 73/14 337/112 |
| 6,480,090 | B1 | * | 11/2002 | Wang | ..................... | H01H 73/26 337/37 |
| 6,512,441 | B1 | * | 1/2003 | Yu | ......................... | H01H 73/30 337/112 |

(Continued)

FOREIGN PATENT DOCUMENTS

| EP | 1 394 408 A2 | 3/2004 |
| EP | 1 640 493 A2 | 3/2006 |
| WO | 2005/066489 A1 | 7/2005 |

OTHER PUBLICATIONS

Search Report dated Nov. 22, 2013, issued in Italian Application No. TO20130255, filed Mar. 27, 2013.

*Primary Examiner* — Anatoly Vortman
(74) *Attorney, Agent, or Firm* — Workman Nydegger

(57) ABSTRACT

A device is described wherein an actuator (3, 4; 103, 104) drives a member, such as a rack (6) meshed with a pinion (5), between two stable positions. For this purpose, elements for stopping the movable member are provided, which cooperate with elements present on the outer housing (2, 21), in which the actuator and the movable member (5, 51) are arranged, for holding at least one of said stable conditions. The device of the invention ensures low energy consumption because the actuator (3) only operates for moving the movable member from one stable position to the other.

22 Claims, 29 Drawing Sheets

(56) References Cited

U.S. PATENT DOCUMENTS

| | | | |
|---|---|---|---|
| 6,714,116 B1 * | 3/2004 | Sang | H01H 73/26 200/339 |
| 7,063,092 B2 | 6/2006 | Cerruti | |
| 7,259,343 B1 * | 8/2007 | Huang | H01H 23/24 200/339 |
| 7,317,375 B2 * | 1/2008 | Yu | H01H 37/5418 337/56 |
| 7,626,482 B2 * | 12/2009 | Huang | H01H 23/24 337/59 |
| 2011/0162947 A1 * | 7/2011 | Huang | H01H 23/12 200/339 |
| 2011/0163836 A1 * | 7/2011 | Darr | H01H 9/10 337/143 |

* cited by examiner

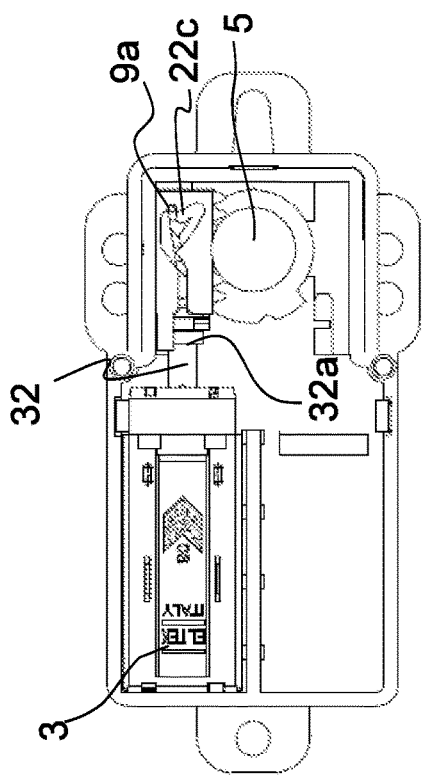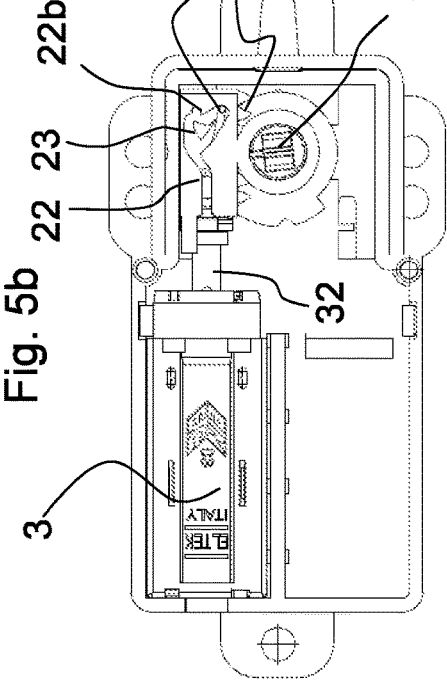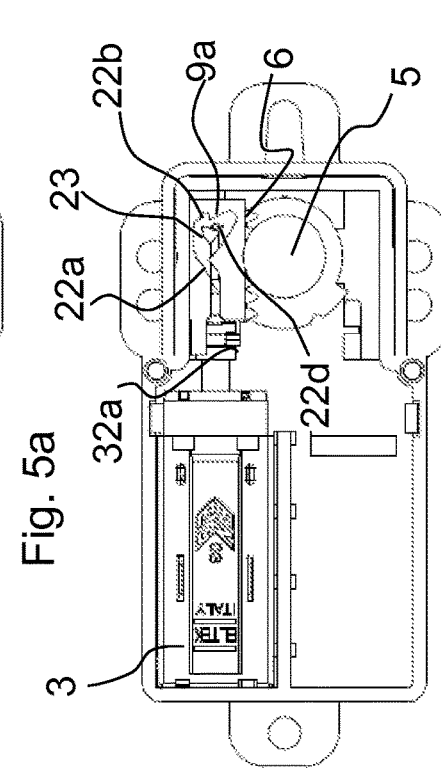

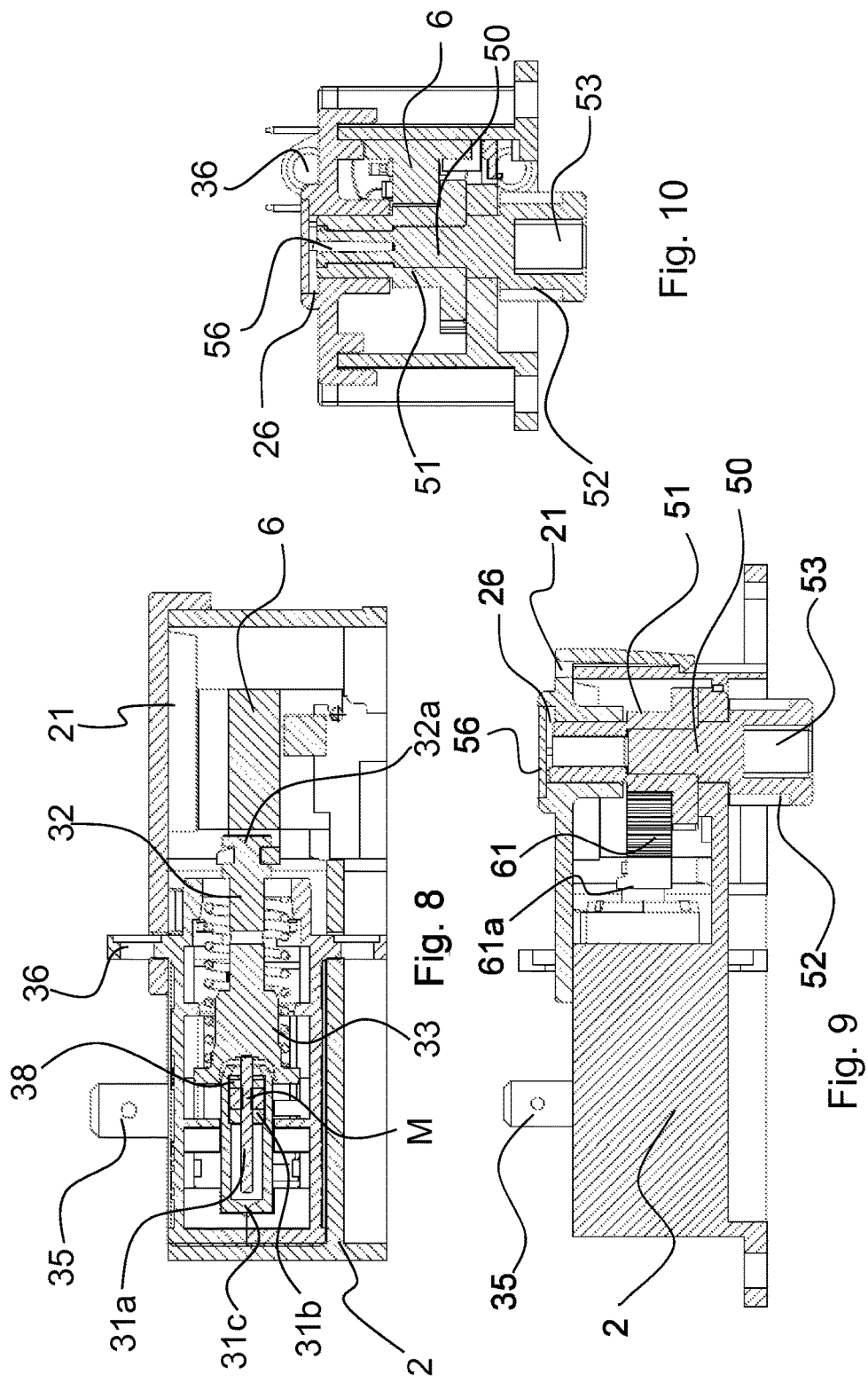

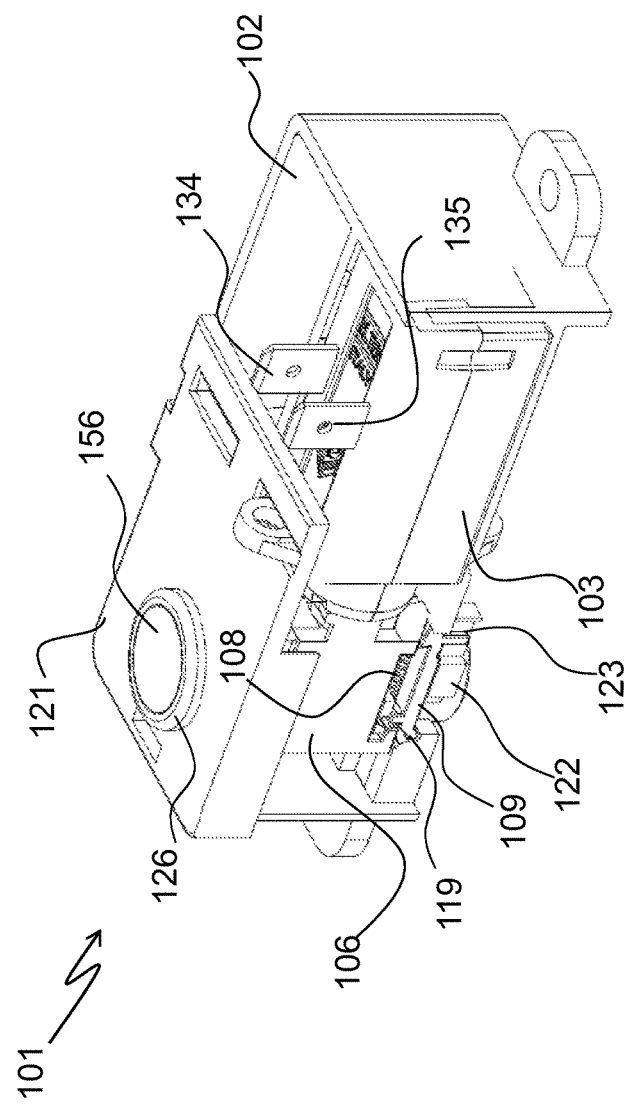

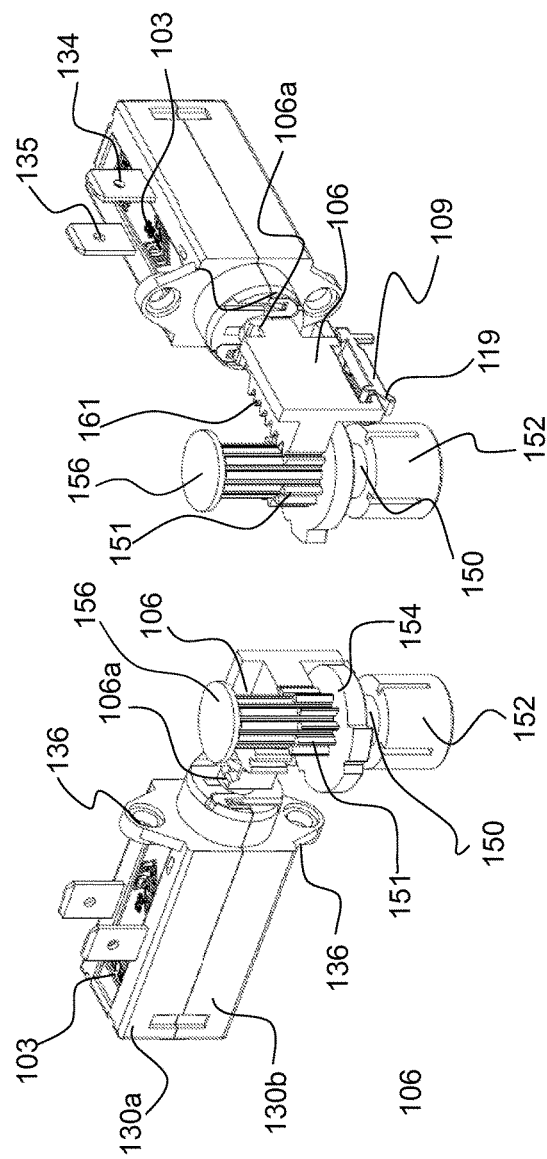

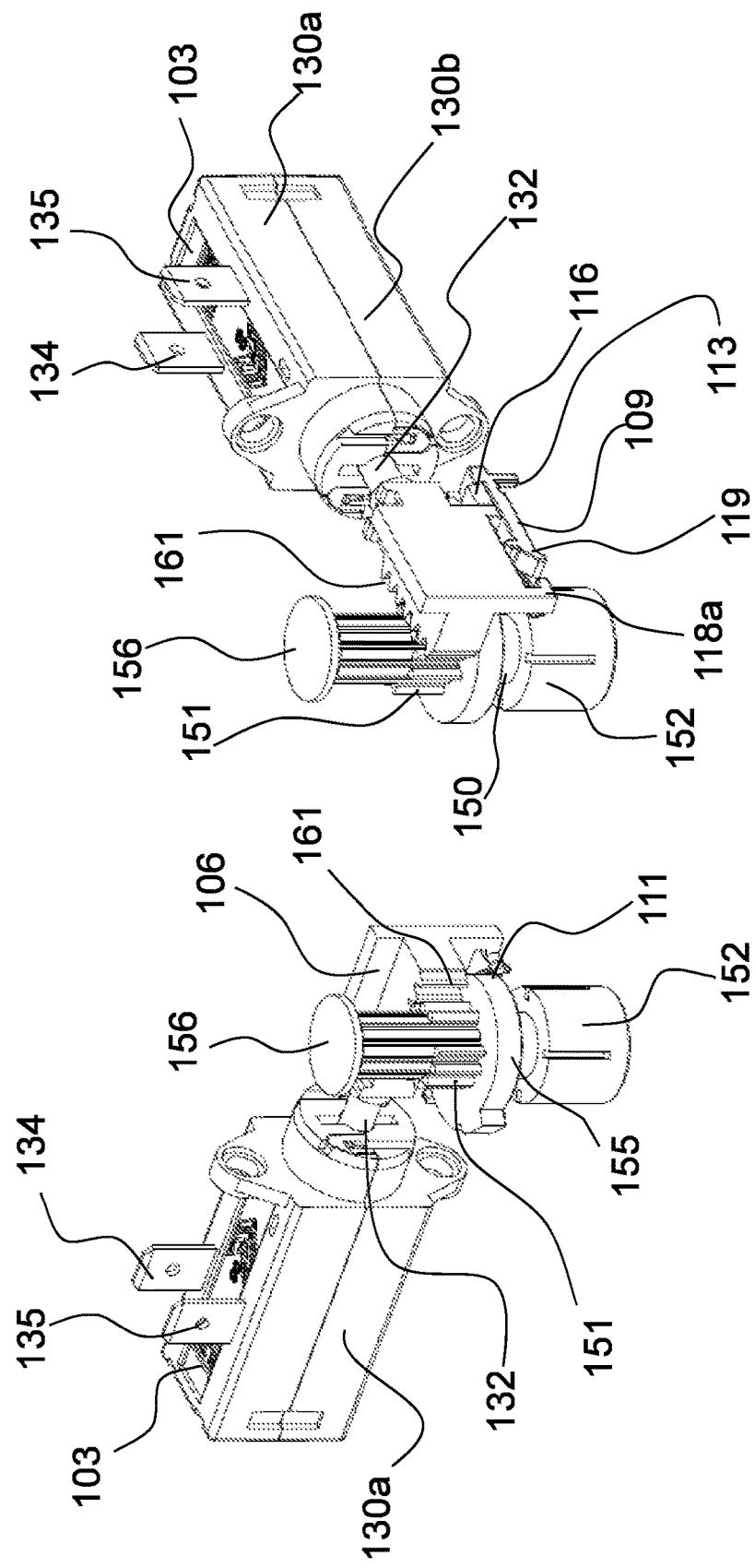

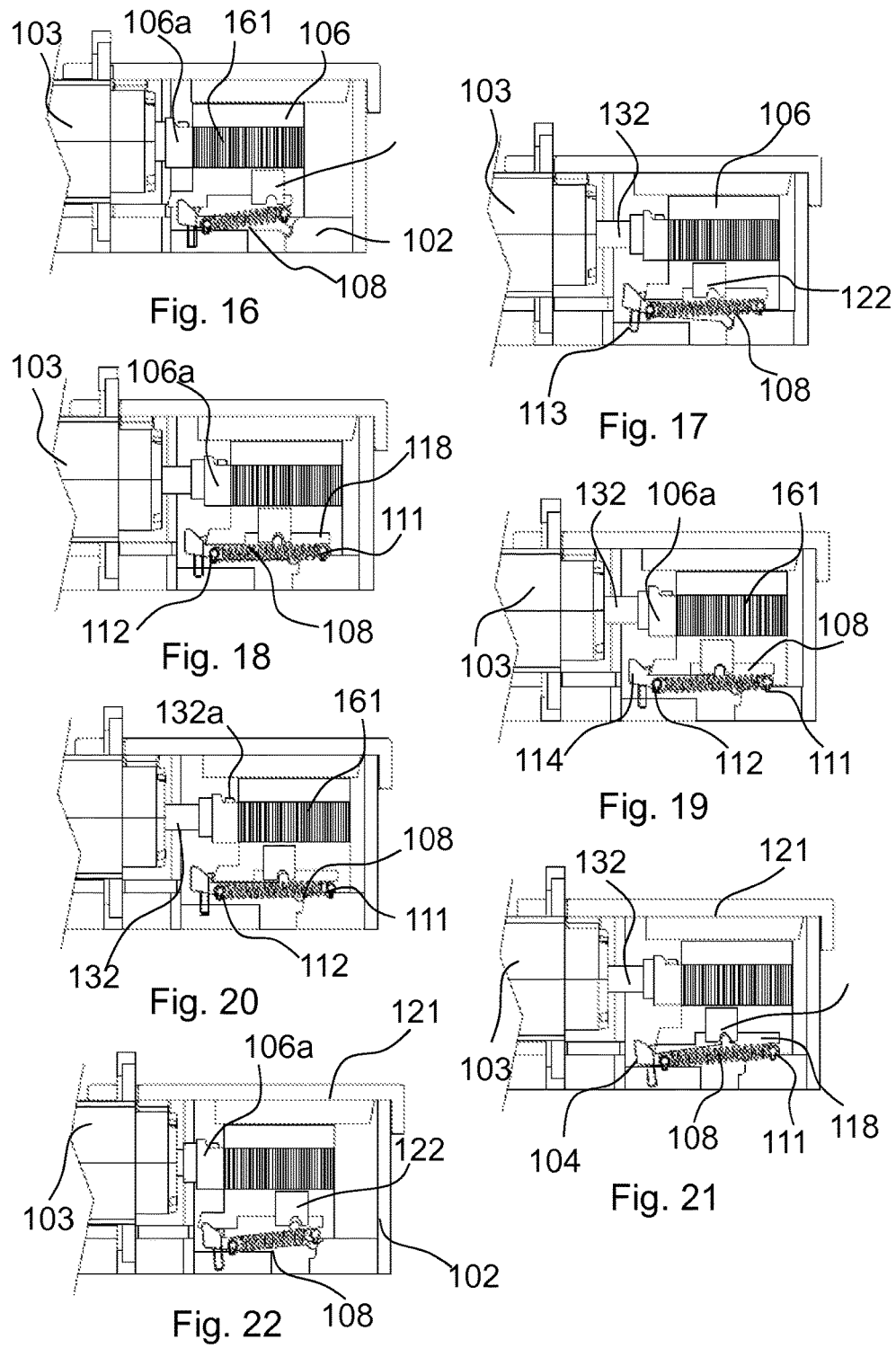

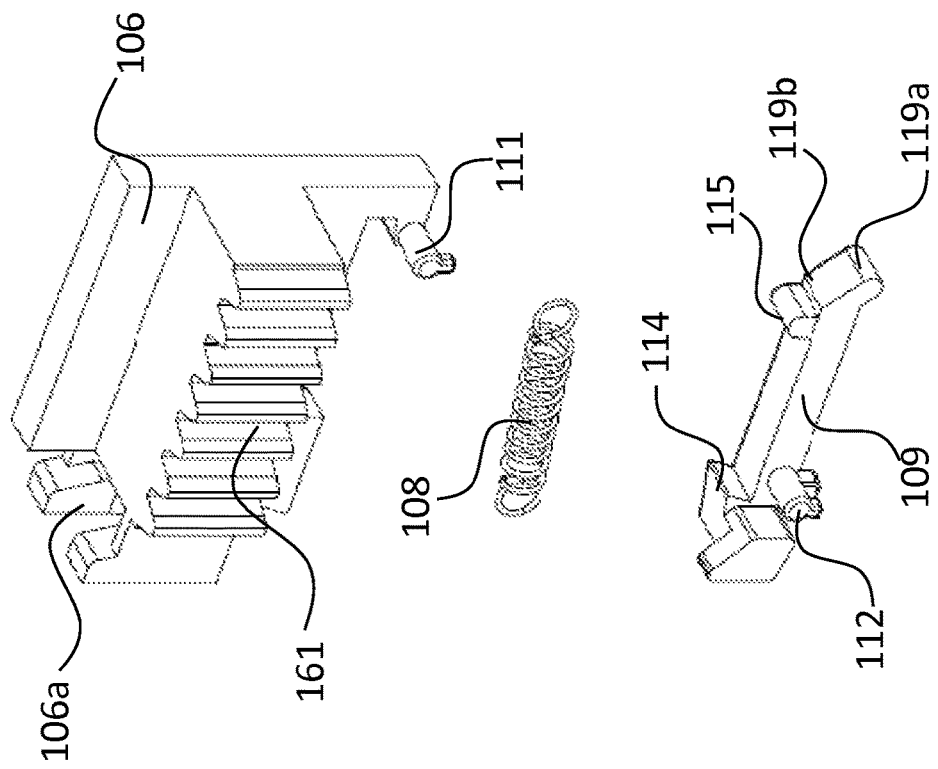
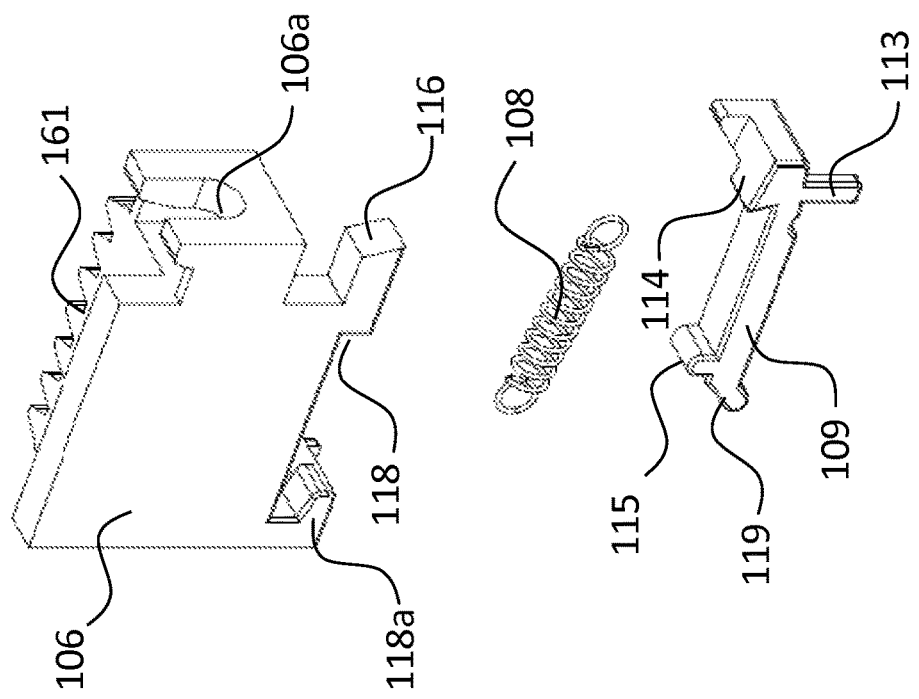
Fig. 31
Fig. 30

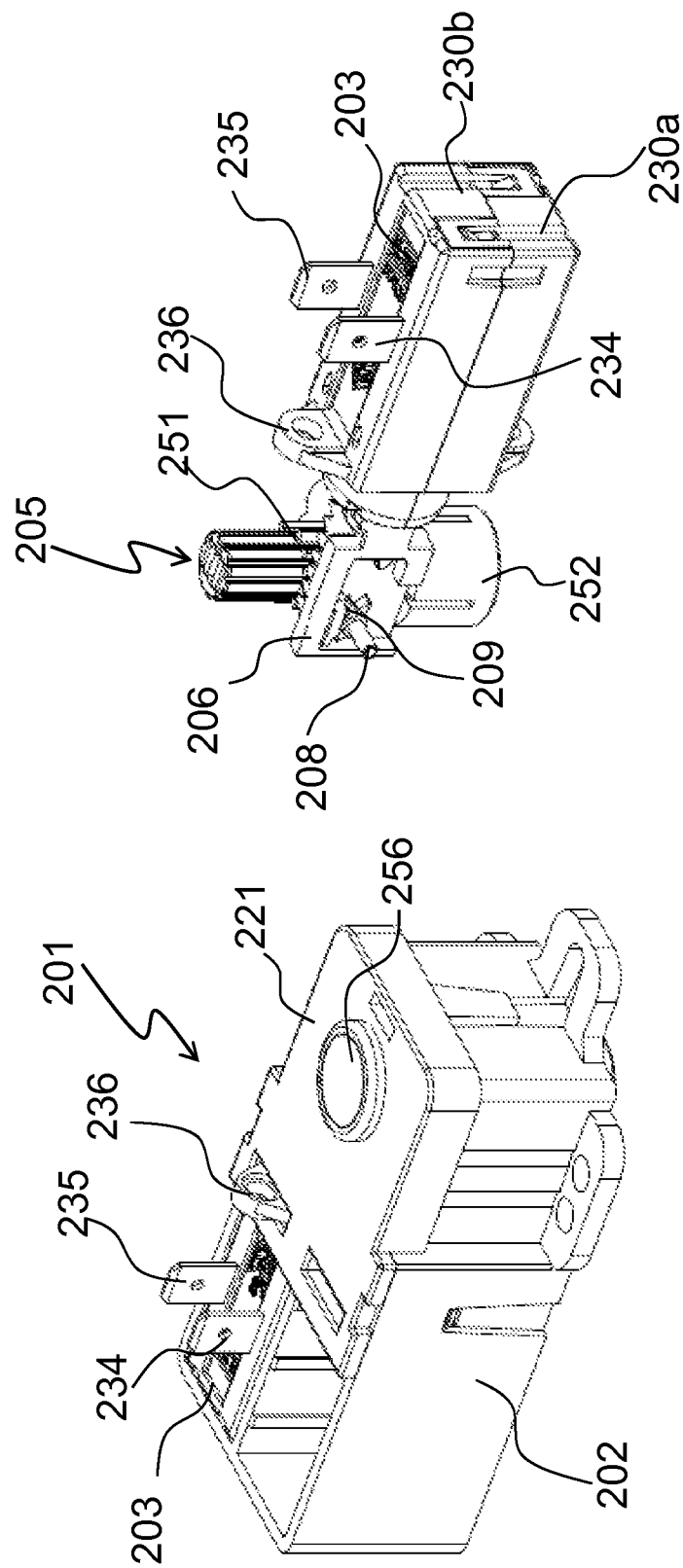

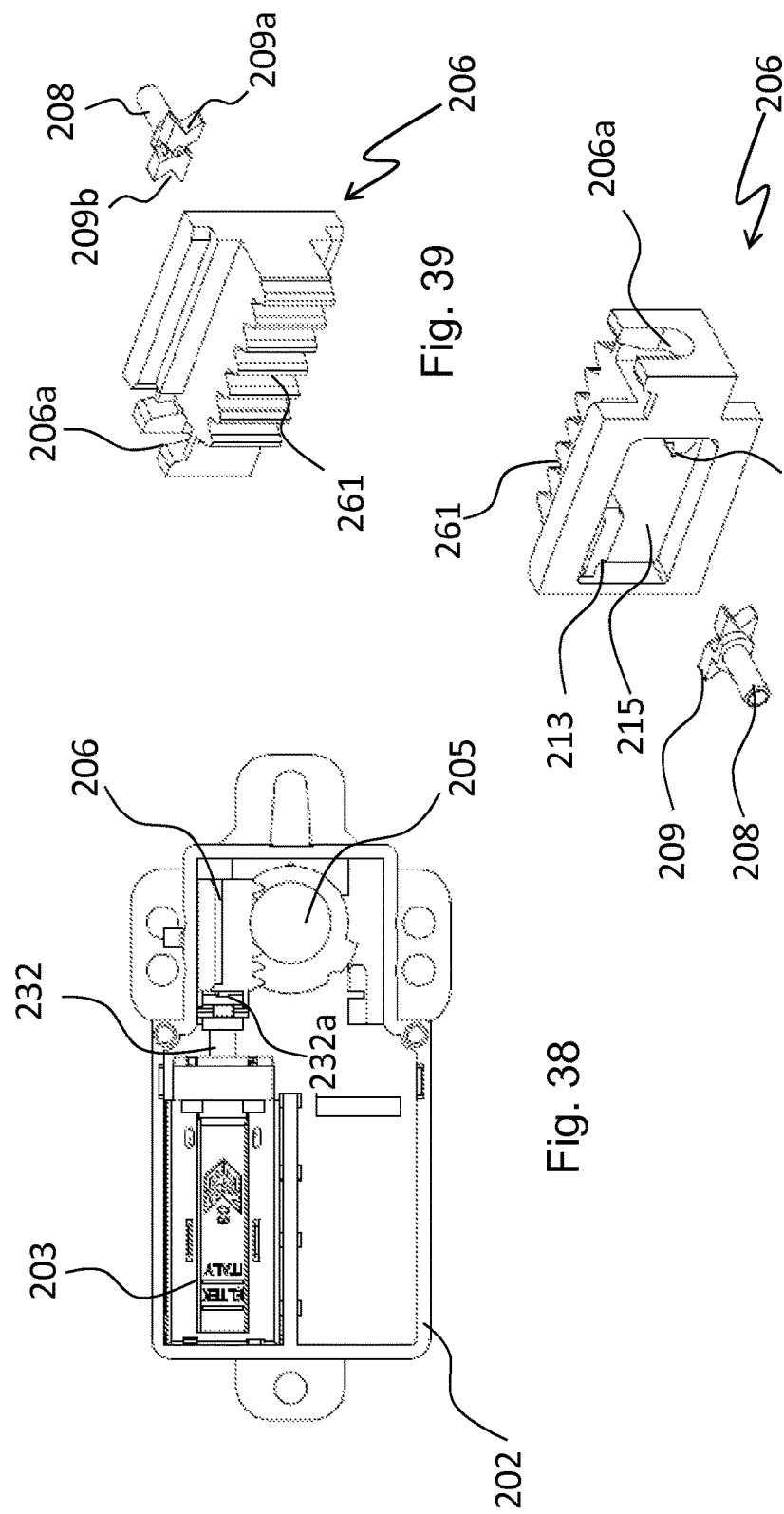

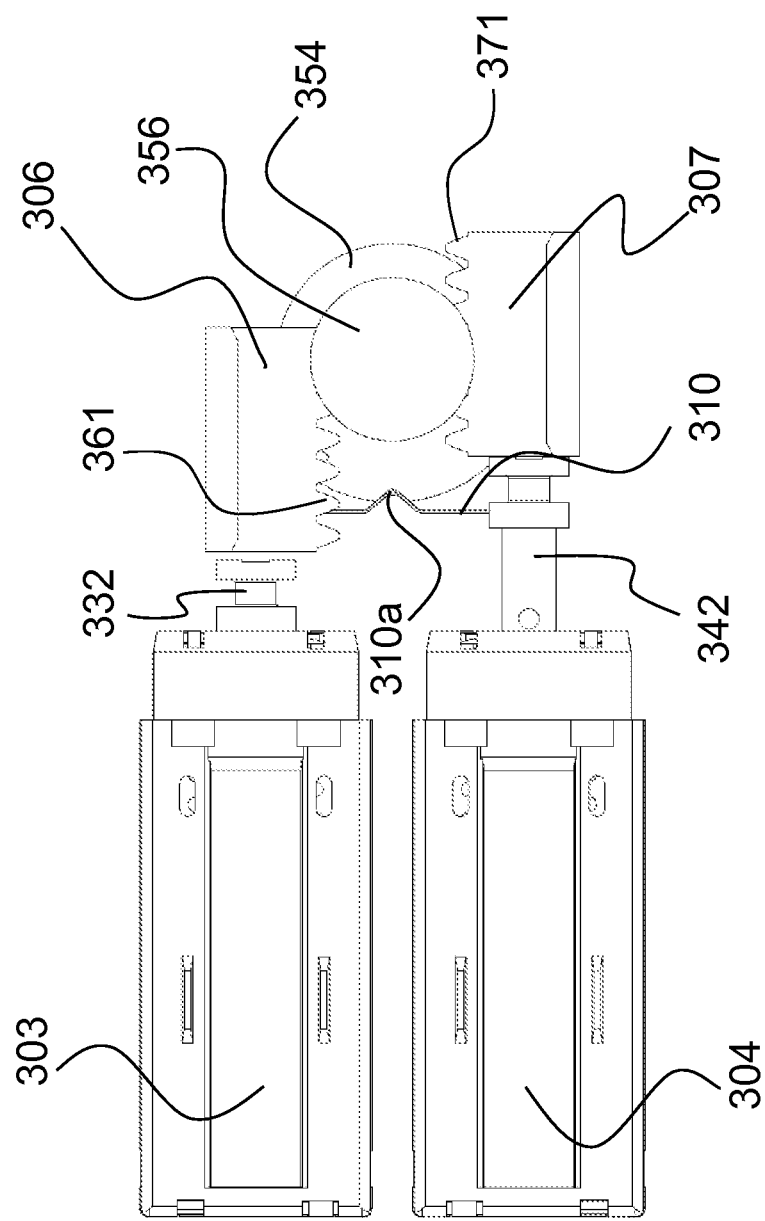

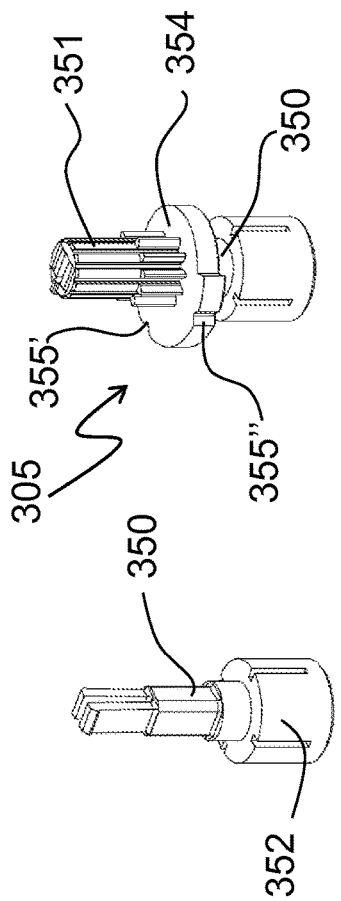
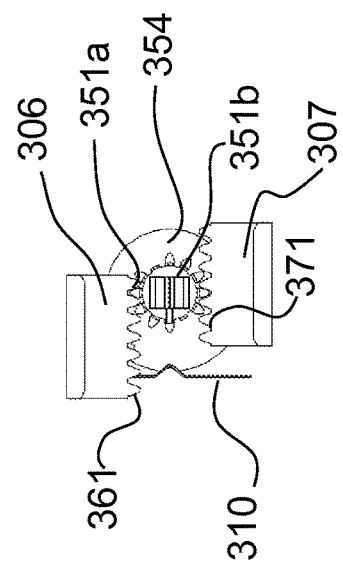
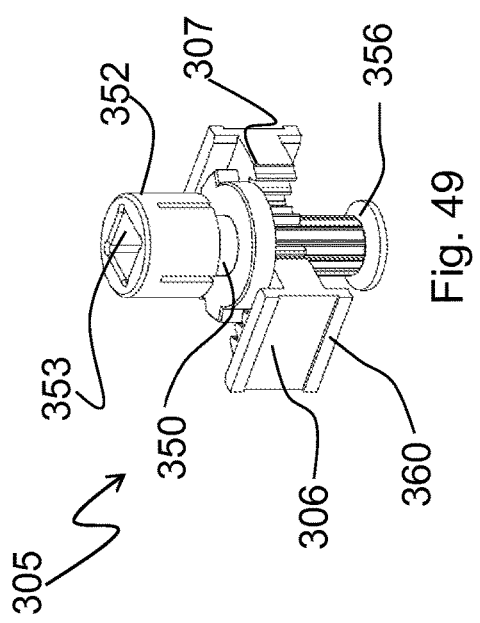
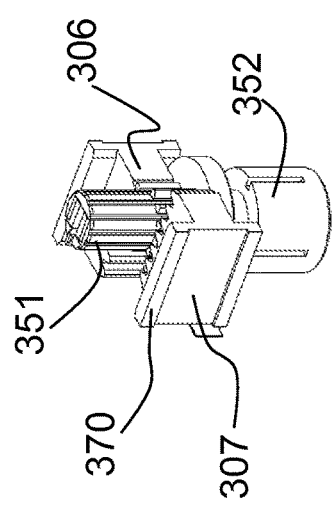

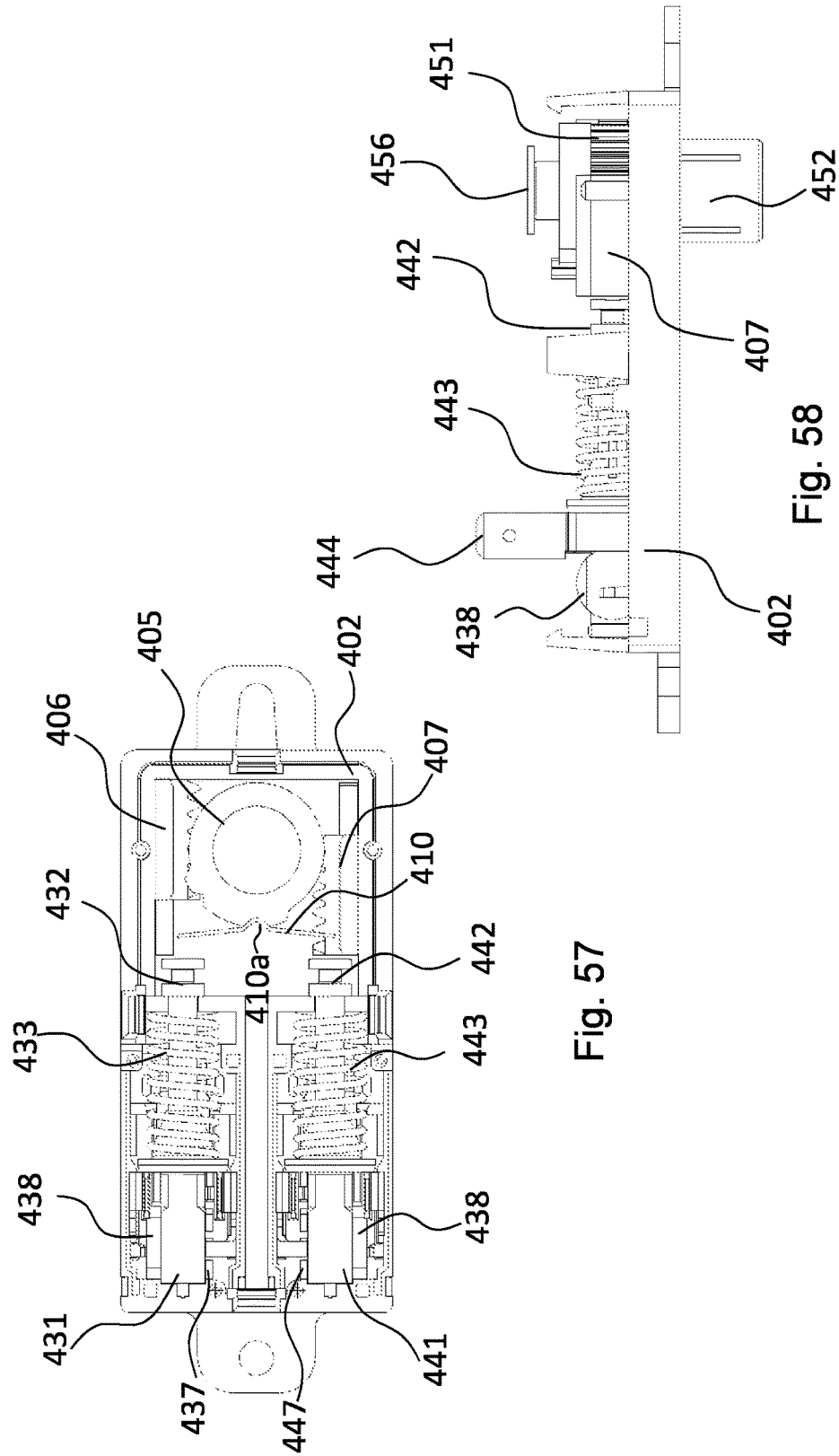

ACTUATOR DEVICE WITH STABLE WORKING POSITIONS

CROSS-REFERENCE TO RELATED APPLICATIONS

This application claims priority to Italian Application No. TO2013A000255, filed Mar. 27, 2013, which application is incorporated herein by specific reference.

BACKGROUND OF THE INVENTION

1. The Field of the Invention

The present invention refers to an actuator device with stable working positions; in particular a thermal and/or electrothermal actuator device with stable angular working positions.

2. The Relevant Technology

As is known, in order to control some components of apparatuses in general, such as household appliances, automatic devices, vehicles, conditioners and the like, whose operation is controlled either remotely (by means of control units or remote controls) or manually, actuators are used which may be of various kinds: electromechanical, thermoelectric, magnetic, hydraulic, etc.

Some of these actuators are systems which can be essentially defined as cylinder-piston systems, wherein a movable part (either the cylinder or the piston, as the case may be) moves linearly and exerts a force on a mechanical member to be controlled.

The latter may be of any kind, shape and size, e.g., the door that closes a container, the gate of a valve, the flap of a ventilation system, and so on.

In this description and in the appended claims, reference will prevalently be made, for simplicity, to thermal or electrothermal actuators, or thermoactuators, which will be briefly discussed later on, it being understood that the invention is also applicable to other actuator types, in particular thermal ones, since it is compatible therewith.

In the light of this introduction, the present invention relates, from a more particular point of view, to thermal actuator devices or thermoactuators or thermoelectric actuators with stable angular working positions, the latter being positions taken in specific operating conditions; in particular, angular positions held in the absence of thermal excitation and/or electric power, e.g., for closing or opening doors, flaps, valves and the like, as aforementioned.

In order to keep these stable conditions, abutment elements are usually employed, i.e., elements such as protrusions, shoulders or strikers, which physically stop the travel of the movable part of the actuator, wherein, however, in such condition the latter must always be kept operational by electric power supplied thereto or otherwise, so that it can exert the force necessary for controlling the member with which it is associated.

One example of a known actuator device designed as explained so far is described in American patent U.S. Pat. No. 7,063,092, the holder of which is the same Applicant of the present application.

This device uses a per se known monostable thermoactuator or thermoelectric actuator, such as an actuator with a metallic body, comprising a wax or another heat-expandable material, and a slidably inserted movable shaft or piston, which is moved by the wax expanding when heated by an electric resistor, subject to the elastic reaction of a spring for repositioning the movable shaft or piston when the electric supply or excitation stops.

A rack is associated with said known monostable linear thermoelectric actuator, which engages with a pinion whose rotations, imparted by the alternating linear motion of the rack, are used for opening and closing the door of a washing agent dispenser of a household appliance, such as a dishwasher or the like.

In particular, the dispenser opens at the end of the forward stroke of the thermoactuator's piston, and this condition is maintained for a preset time interval, so as to allow the wash water of the dishwasher to clean the dispenser compartment of all residues of the agents contained therein.

During this time interval, the thermoactuator or thermoelectric actuator is electrically powered to exert the force required for holding the dispenser open, and only at the end of this interval it is de-energized in order to close the dispenser.

As can be easily understood, such a solution, though efficient in opening and closing the dispenser, is not equally efficient from an energy consumption viewpoint, in that the thermoelectric actuator continues to draw electric current throughout the actuation time, i.e., as long as it is held in a second position other than a first idle position.

This may not be satisfactory because, as is the case of the latest household appliances, for example, very restrictive conditions must be complied with as far as energy consumption is concerned; the same applies to the case wherein a great force must be exerted on the member controlled by the actuator, since the large amount of power required by the actuator for long periods of time may turn out to be costly and/or harmful, resulting in the risk of premature failure of the actuator itself.

Let us consider, in fact, that the internal pressure of some thermoactuator versions may be as high as some hundreds of bar, or even in excess of 1,000 bar, resulting in the structure being subject to high mechanical stresses further increased by concurrent thermal stresses, which may vary depending on the actuator's heating or energization time.

BRIEF SUMMARY OF THE INVENTION

The technical problem underlying the invention is therefore to provide an actuator device which overcomes the drawbacks affecting those known in the art, as previously referred to.

An idea for solving this problem is to provide a thermal or thermoelectric actuator device associated with means for stopping and/or engaging and/or holding the member adapted to determine a rotary or angular movement, where the actuator exerts or transmits a force; preferably, said member is a pinion or anyway a rotary or angularly-movable member, wherein said member may also be or comprise a rack or a sliding member, such as a member moving or sliding along a linear or curved path, preferably associated with a rotary or angularly-movable element.

It should be considered that said movable member, provided with stopping and/or engaging and/or holding means, is also equipped with coupling means adapted to transmit or receive motion, such as the teeth of said pinion and/or of said rack, or other coupling or transmission means between rotary elements and slidable elements or linearly-moving elements, such as surfaces adapted to be coupled to each other by friction, e.g., sliding and rotary elements made of rigid material, covered or associated with respective elastomeric coupling surfaces.

The main features of the actuator device according to the invention are specifically set out in the claims appended to this description.

BRIEF DESCRIPTION OF THE DRAWINGS

Further objects and features of the invention, as well as the effects and advantages deriving therefrom, will become more apparent from the following description referring to some preferred but non-limiting examples of embodiment, as schematically shown in the annexed drawings, wherein:

FIGS. 5a-5d are partially sectional views showing from above the operation of the device of the preceding Figures, in respective operating conditions;

FIGS. 8, 9 and 10 are sectional views along lines A-A, B-B and C-C of FIG. 7, respectively;

FIG. 11 is a perspective view of a second embodiment of the actuator device of the invention, with a part thereof removed for clarity;

FIGS. 12 and 13 are perspective views, from different viewpoints, of some details of the embodiment of FIG. 11 in a first operating condition;

FIGS. 14 and 15 are perspective views, from different viewpoints, of some details of the embodiment of FIG. 11 in a second operating condition;

FIGS. 16-22 show respective consecutive operating steps of a detail of the second embodiment of the device of FIG. 11;

FIGS. 30 and 31 show some enlarged details of the device of FIG. 11 from different angles;

FIG. 34 is a perspective view of a third embodiment of the device according to the invention;

FIG. 35 is a perspective view of some details of the device of FIG. 34;

FIG. 38 is a plan view of the device of FIG. 34 without the cover;

FIGS. 39 and 40 show some enlarged details of the device of FIG. 34, from respective viewpoints;

FIG. 48 is a plan view of FIG. 47;

FIGS. 49-53 are perspective views from respective angles of some details of the device of FIG. 45;

FIGS. 57 and 58 show a plan view and a side view of the device of FIG. 56;

DETAILED DESCRIPTION OF THE PREFERRED EMBODIMENTS

Figure 2:
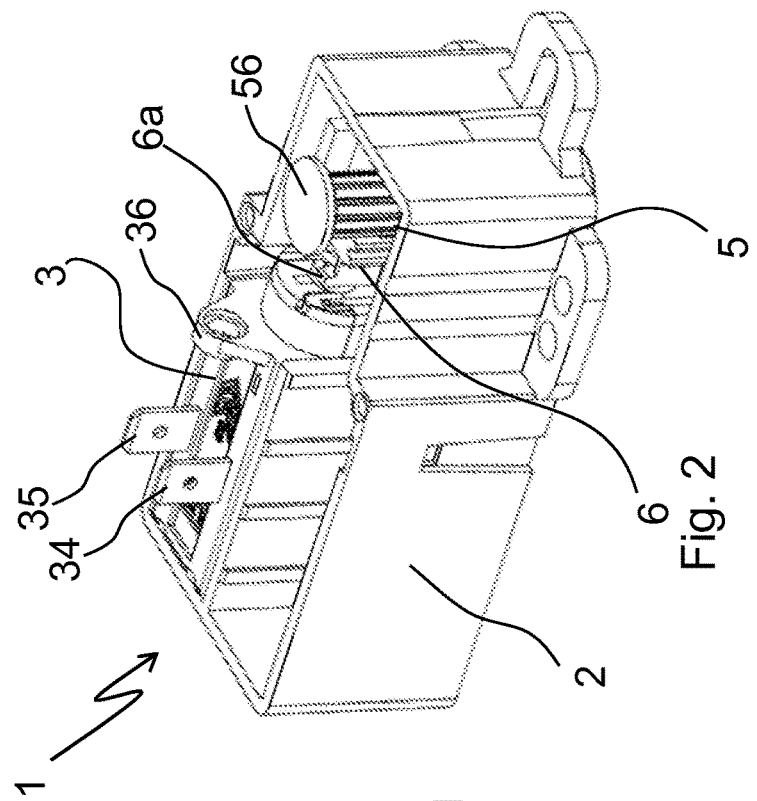
FIGS. 1 and 2 are perspective views of an actuator device according to the invention, respectively with and without the top cover.
Figure 1:
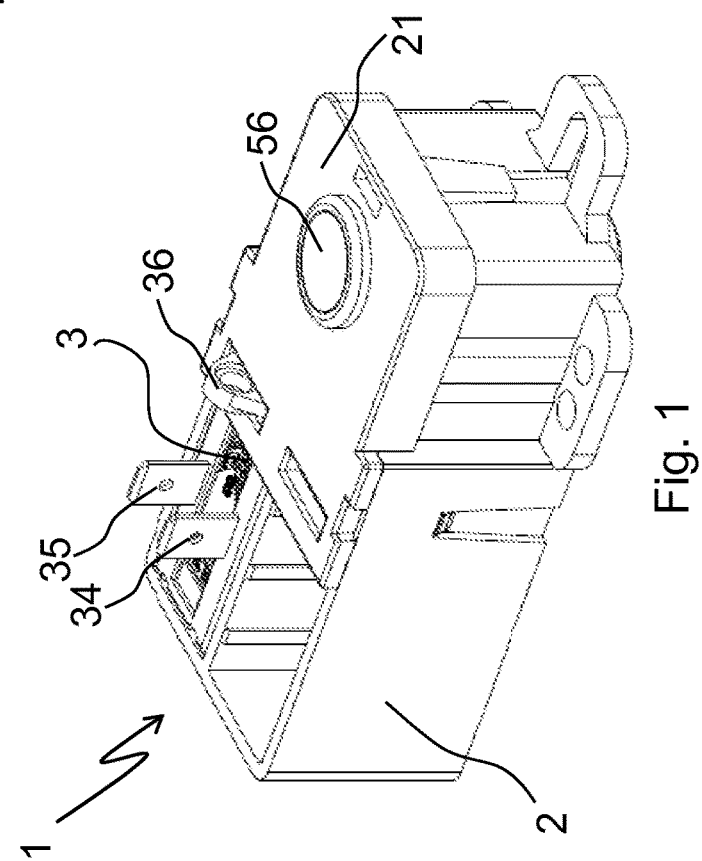
Figure 3:
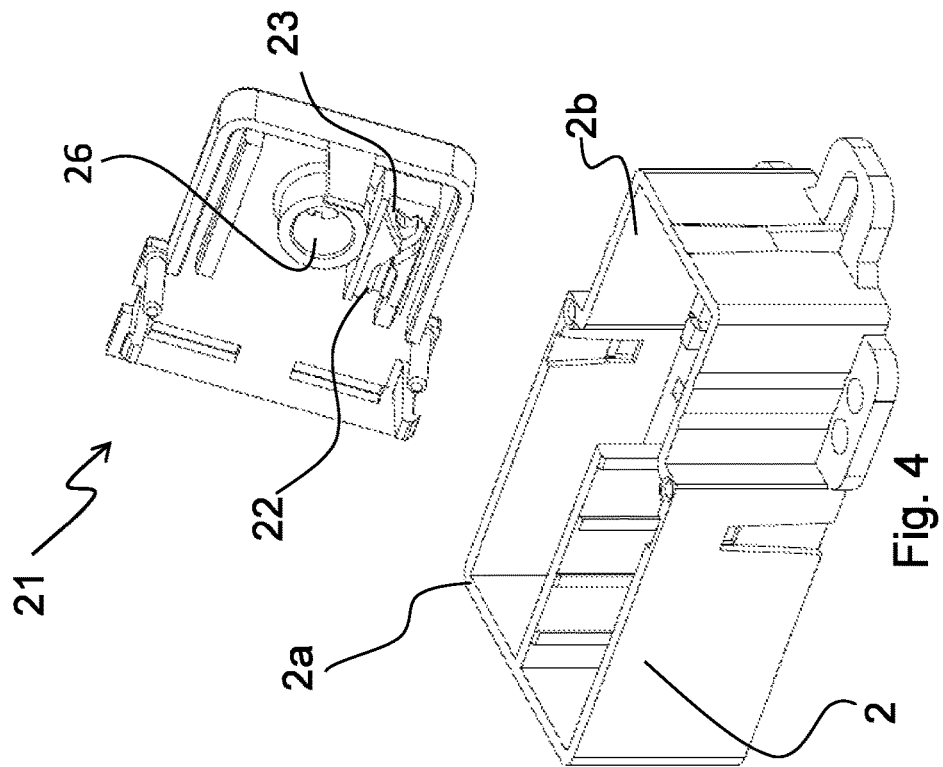
FIG. 3 is a perspective view of the device of FIG. 2 from a different angle.
Figure 4:
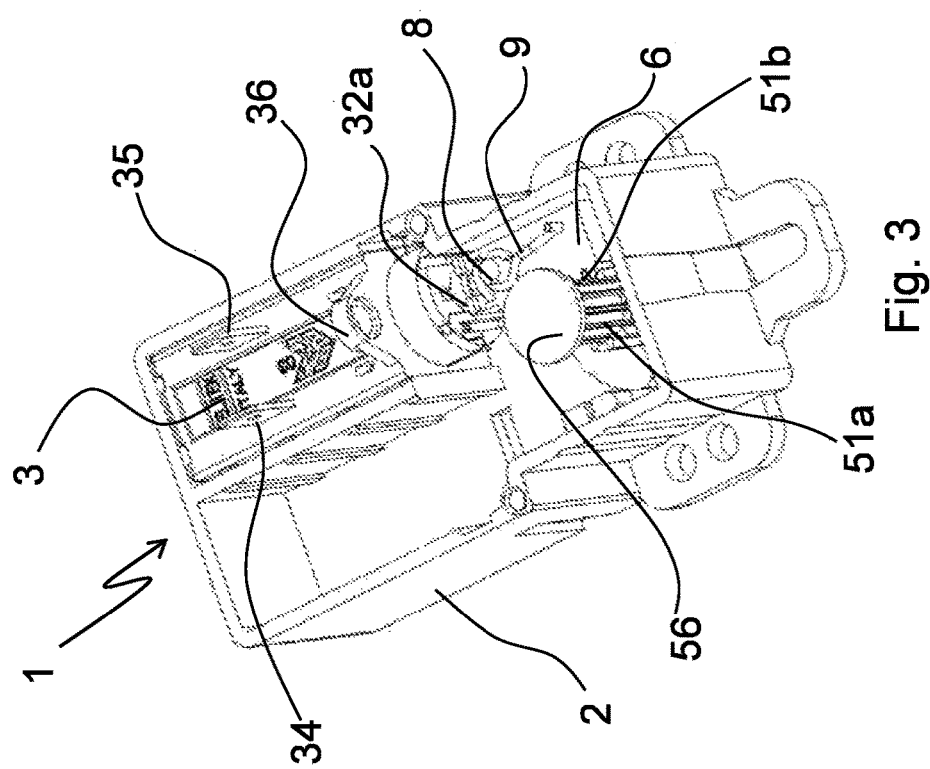
FIG. 4 shows in detail the housing shell and the cover of the device of the preceding Figures.

With reference to the above-listed drawings, it must be pointed out that terms such as "high", "low", "upper", "side" and the like, mentioned in the description, refer to the arrangements shown in the annexed non-limiting drawings, and as such they have an exemplary and non-limiting character; furthermore, any special shape, structure or feature described herein may be appropriately combined in one or more "embodiments", even different from those illustrated and/or described, and the references used herein only aim at better clarity and convenience, without limiting the protection scope of the invention.

In this description, definitions such as "embodiment" and the like indicate that at least one particular configuration, structure or feature described in relation to that specific embodiment or example is comprised in at least one possible implementation of the invention; therefore, phrases such as "in an embodiment" and the like, which may occur several times in this description, will not necessarily refer to the same embodiment or implementation of the invention.

With specific reference to FIGS. 1 to 10, there is shown a first embodiment of the actuator device according to the invention, designated as a whole by reference numeral 1.

The device comprises a shell or outer housing part 2 for arranging at least some of its components, which include a thermal or electrothermal actuator 3, hereafter also referred to, for brevity, as thermoactuator.

In a preferred example, the thermoactuator 3 comprises a thermal assembly 31 having a metallic and/or thermally conductive body, with an inner chamber 31b containing a heat-expandable material M (such as, for example, wax) and a thrust element 31a, which is adapted to move a shaft or stem 32 coming out of the outer housing 2, on which elements for closing and sealing the housing 30 are mounted.

Preferably, said thrust element 31a is made of metal and is at least partly in contact with said expandable material M.

Preferably, the thermoactuator 3 further comprises an insulating housing 30 and an additional thrust element, substantially in the form of a shaft or stem 32, e.g., made of insulating plastic material, being also associated or equipped with an electric heater 38, typically consisting of a positive temperature coefficient (PTC) resistor, electrically powered through at least one electrically conductive terminal 34, 35.

When there is voltage across the power terminals, the electric heater 38 being run through by current generates heat and causes the heat-expandable material to expand in the chamber 31b: such expansion, in turn, causes the thrust element 31a to move linearly towards the outside of its body 31, so as to move the shaft or stem 32 up to a predetermined second working position, which is generally defined by a mechanical abutment element.

When no longer supplied with electric power, the heater 38 cools down and the heat-expandable material contracts again, thereby causing the thrust element 31a to return inside the body 31, i.e., to the initial idle position, possibly with the aid of an elastic return element, such as a spring 33; the spring 33 preferably acts upon said stem 32, which in turn cooperates with said thrust element 31a.

The stem 32 preferably has an elongated shape and is associated with said spring 33, which is useful to ensure the elastic return of the thrust element 31a and/or of the thermal assembly 31 and/or of the actuator 3 into the idle condition when it is thermally de-excited and/or electrically turned off and the wax therein has cooled down and contracted; for this purpose, the spring 33 preferably pushes said stem 32, which in turn pushes the thrust element 31a towards the inside of the chamber 31b.

The thermoactuator 3 is of the monostable linear type, meaning by this that it allows to obtain a travel to a final working position only as long as it remains electrically powered and/or thermally excited, whereas when said electric power and/or thermal excitation stop it will return to its normal idle position.

The most important advantages offered by such a typology of actuators are the great force or working power that they can develop notwithstanding their small dimensions, low cost, low consumption and quietness of operation.

Figure 6:
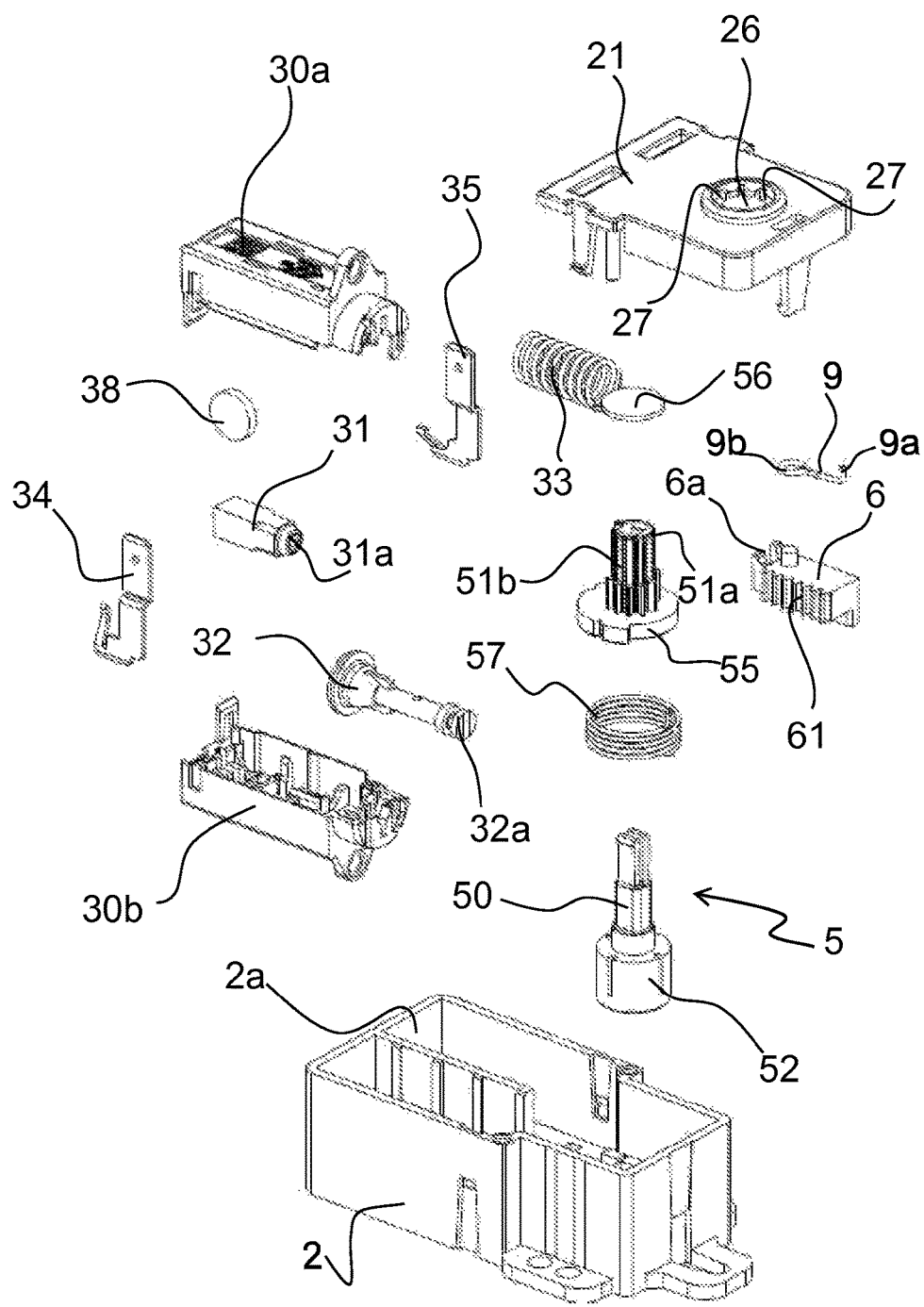
FIG. 6 is an exploded view of the device of the preceding figures.
Figure 7:
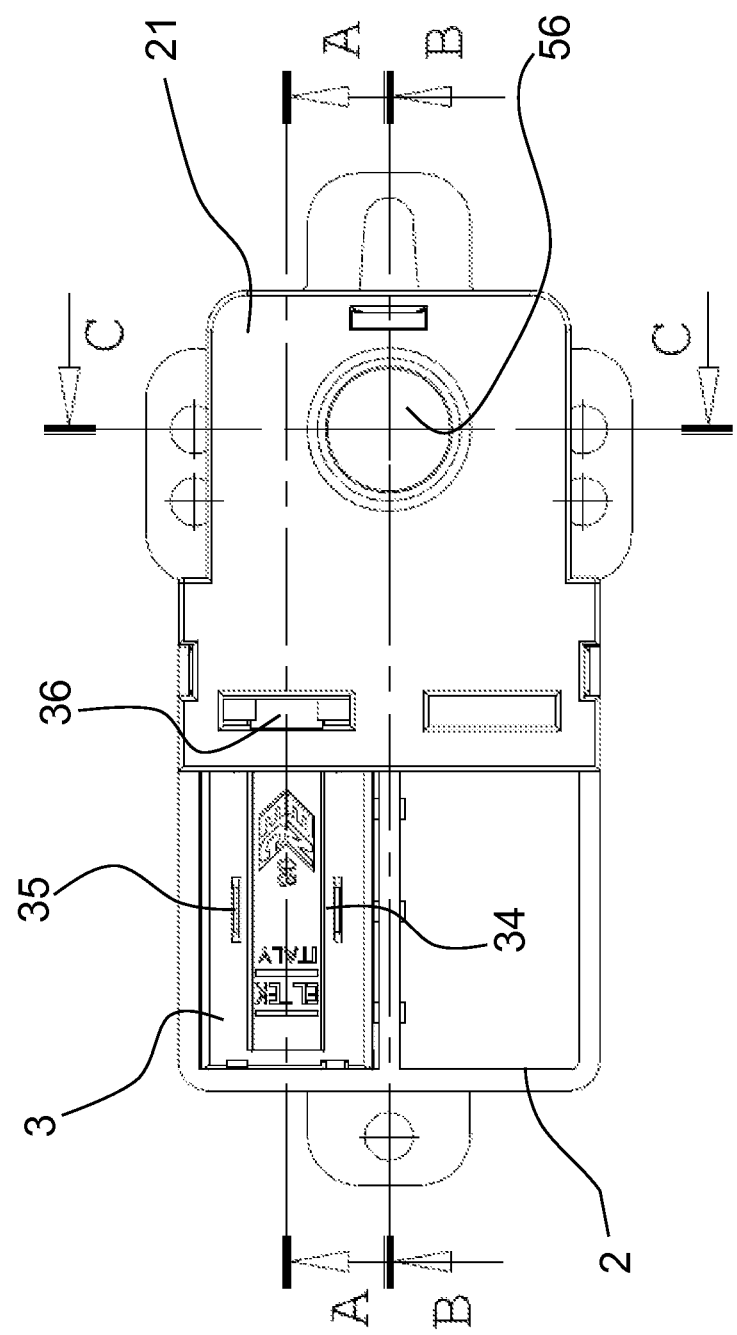
FIG. 7 is a plan view of the device of the preceding figures.

As clearly shown in FIG. 6, the actuator 3 comprises a housing of its own consisting of two external half-bodies 30a, 30b accommodating the thermal assembly 31, which contains the wax or expandable material; preferably, it also houses an electric heating element or PTC resistor 38, at least part of electric connection or power terminals 34, 35, at least part of a stem or shaft 32, and an elastic element or spring 33.

The actuator 3 comprises fastening means, which in this example consist of symmetrical fastening flanges 36, wherein each fastening element or flange 36 is formed in a respective half-body 30a, 30b.

For its operation, the thermoactuator 3 is preferably equipped with at least one respective pair of electric contacts 34, 35 to be connected to a power supply source, as is the case of household appliances, for example, wherein the actuator device 1 according to the invention can be used to advantage; preferably, said electric contacts 34,35 are electrically coupled and/or connected to the heater or PTC resistor 38 and to a metal body 31c of the thermal assembly 31, with one electrically and thermally conductive end of the heater 38 in contact with the metal body 31c, thus essentially forming a "terminal 34-heater 38-body 31c-terminal 35" electric series.

The thermoactuator 3 is arranged inside the shell 2, in particular with its working axis defined by the direction of movement of the stem 32 and/or of a first transmission member, substantially consisting of a rack 6, preferably arranged horizontally with the fastening flanges 36 projecting upwards and downwards and extending through respective apertures 20 provided on the cover 21 that closes the shell 2 and on the bottom of the latter.

The fastening element 36 of the thermoactuator 3 may however be absent or be of a type other than a flange, resulting in a different coupling or engagement with the housing or shell 2.

According to the non-limiting example shown in the drawings, the shell 2 has a rear portion 2a that houses the thermoactuator 3 and a front portion 2b that houses a second rotary or angularly-movable transmission member, called pinion 5 for simplicity.

The latter advantageously consists of a first central element or pin 50 for supporting and/or fitting a toothed wheel 51; it should be considered that said toothed wheel 51 may have teeth either on its whole circumference or curved profile or on only a portion thereof, preferably on two or more portions, thus being divided into distinct sectors as shown in some drawings, wherein the circumference of the toothed wheel 51 comprises two opposite or specular or semicircular sectors 51a, 51b.

The pin 50 of the pinion 5 has a base 52, preferably having a greater diameter than the pin itself and/or than the toothed wheel 51, in the form of a coupling or fitting element 53, e.g., comprising a polygonal or square protuberance or cavity 53, for coupling the rotary pinion 5 to an output shaft or another member driven by the externally associated actuator device 1 (not shown in the drawings), such as a shaft having at least one end with a shape complementary to the coupling element 53, e.g., polygonal or square.

Preferably, in the cover 21a seat 22 is formed for housing an insert 56 of the cover 21; in accordance with a preferred embodiment, said insert is made of transparent material, such as a transparent thermoplastic material or glass, to allow seeing or checking from outside the cover 21 the angular position of the upper end of the pinion 5 and/or of the toothed wheel 51. To this end, suitable notches or protuberances 27 are also present inside the seat 26 of the cover 21, which cooperate with a reference provided on the pinion 5 and/or on the toothed wheel 51 to indicate the angular position thereof.

For example, the reference on the pinion may consist of the separation between one sector 51a and the other sector 51b on the toothed wheel 51 of the pinion. The position of the pinion 5 may advantageously be detected through the transparent insert 56 with optical means (e.g., photocells, luminous rays, etc.), which are not shown in the drawings because per se known.

Another possible function of the insert 56 is to protect the coupling between the cover 21 and the pinion 5 against dust and dirt in general, which may cause friction and/or wear over time.

The actuator device 1 may further comprise a coil spring 57, which, in the assembled condition of the pinion 5, is interposed between the shell 2 and the base 52 of the pin 50 to facilitate the elastic return of the base 52 and/or pin 50 into the idle condition as soon as the thermal excitation and/or electric supply stop, preferably also promoting the repositioning or return of the pinion 5 and/or of the toothed wheel 51, and consequently also of the rack or sliding element 6.

It should be noted, in this respect, that the rack 6 is preferably integral with the stem 32, and therefore the return of the stem 32, caused by the elastic reaction of the spring 33, preferably causes also the movement or return of the rack 6 and, consequently, of the pinion 5; it is however conceivable to add said spring 57 in the event that the force of said spring 33 is too weak, e.g., if the spring 33 is only sized for returning the stem 32 alone, or if there is a strong countering force exerted by the external apparatus connected to the actuator 1.

The rack or sliding element 6 is preferably guided laterally by at least a portion of the housing 2, 21, e.g., by the side walls of the front portion 2b of the shell 2 and/or by the walls of the cover 21, against which it preferably abuts.

The rack 6 is connected to or integral with the end 32a of the stem 32, in particular by means of a rack shank 6a. On its top face, the rack 6 has a protruding peg 8 acting as an articulation or pivot for a movable hooking element 9, preferably curved and provided with a protuberance or shaped like a hook at one end 9a; in particular, said movable element consists of a profiled metal wire, preferably so shaped at one end as to create a ring or seat 9b to be coupled or fitted onto said peg 8, whereas at the other end it is so shaped as to form said protuberance or hook-shaped element 9a.

Said hooking element 9 fits into a glyph or groove 22 provided on the cover 21 of the device, which defines a substantially closed path along which the hook 9 moves; in particular, said groove 22 creates a cam-shaped path for said hooking element 9 and/or a closed path 22 with intermediate hooking positions for said element 9.

In FIGS. 5a-5d one can appreciate the position of the hook 9 in successive operating steps corresponding to different positions of the rack 6 and of the stem 32.

The device 1 according to the invention operates as follows. In order to turn the pinion 5 clockwise with reference to a top view of the device 1 (like those of FIGS. 1 and 2), the rack 6 is moved and/or pushed and/or advanced by the thermoactuator 3.

The latter is electrically powered through the contacts 34, 35, which heat up the PTC electric resistor 38 arranged inside the thermal assembly 31.

The activation of the thermoactuator 3 causes the thrust element 31a to move and operate the stem 32, which comes out of the body 30 of the thermoactuator 3 and, by overcoming at least the countering force of the spring 33, pushes and moves the racks 6, to which it is preferably connected by means of the head 32a-shank 6a coupling.

The travel of the rack 6 is thus substantially equal to that of the thermoactuator 3 (typically a few millimeters, e.g., in the range of 4 mm to 12 mm or even more), and rotates the pinion 5 by a preset angle as a function of the transmission ratio of the toothed wheel 51, e.g., an angle between 30 degrees and 180 degrees, preferably between 45 degrees and 90 degrees.

Preferably, for obtaining a 90 degree rotation a rotary element 5 with a toothed wheel 51 having twelve 0.75 module teeth is used, whereas for obtaining a 50 degree rotation a rotary element or pinion 5 with a toothed wheel 51 having twenty-two 0.75 module teeth is used.

Let us consider the travel of the thermoactuator 3 starting from an initial idle condition (FIG. 5a), wherein the stem 32 is retracted in the housing 30 of the thermoactuator 30; at this stage, the end 9a of the hooking element 9 is in the initial position or section 22a of the path 22.

The activation of the thermoactuator 3 causes the stem 32 and the rack 6 to move forwards, along with the hooking element 9 pivoted to the peg 8; at this stage, the pinion 5 rotates through the effect of the meshing between the toothed wheel 51 and the teeth 61 of the rack 6, while at the same time the hook 9 advances along the first section 22a of the groove 22, up to an abutment point 22b preferably comprising a seat of the groove.

The subsequent deactivation of the thermoactuator 3 causes the stem 32 and the rack 6 to move backwards, held by the hook 9, which moves backwards along a second section 22c until it abuts against a protrusion 23 and/or gets into an engagement seat in the groove 22 (FIG. 5c).

At this stage, therefore, the thermoactuator 3 receives no power and the abutment of the hook 9 against the protrusion or seat 23 holds it against the action of the spring 33, so that this operating condition is stable and the pinion 5 is locked, in particular in a working position.

Note that, for this purpose, the protrusion or seat 23 has a slightly concave profile, thus ensuring that the hook 9 is housed securely.

In order to release the latter from the position thus attained, the thermoactuator 3 is activated or electrically powered again, thus causing the stem 32 and the rack 6 connected thereto to move forwards until the hook 9 disengages from the protrusion 23 and travels along the third section 22d of the groove 22 to arrive at a further end-of-travel position or end 22e of the path 22 (FIG. 5d).

The following deactivation of the thermoactuator 3 causes the stem 32 and the rack, no longer held by the hook 9, to move backwards, so that the system will return into the initial condition; at this stage, the hook 9 returns into the initial position or section 22a of the path 22.

Also said pinion or angularly-movable element 5 rotates as a consequence of the return movement of said rack or sliding element 6 with which it is meshed and/or engaged.

As can be easily understood, the device 1 allows to obtain an alternating linear motion of the rack 6 and, if the latter is engaged with a pinion 5 as in this case, also an angular motion or an alternate rotation of an output member, such as a shaft or the like.

This result is attained by activating the thermoactuator 3 and/or the device 1 for a short time, as strictly necessary for moving the system between two positions, i.e., the one in which the rack is retracted together with the stem 32, and the one in which it is advanced and locked by the hook 9 that engages the protrusion or seat 23, e.g., an intermediate engagement position 23 along the path 22.

Thus, for example, if the actuator device 1 is used for a washing agent dispenser of a household appliance like that disclosed in the above-mentioned American patent U.S. Pat. No. 7,063,092, or for controlling an obstructor or a flap, the time during which the pinion 5 is held in the locked condition depends on the wash or utilization cycle and may be as long as a few minutes (e.g., 5-15).

In such time interval, the thermoactuator 3 in the device 1 of the invention is not electrically powered, resulting in an evident consumption advantage.

In this regard, it must be pointed out that said hook-shaped element 9 may possibly be secured to a part of the pinion 5, cooperating with a similar closed path or cam path formed in another part of the housing 2,21.

Likewise, also the positions of the hooking elements 9, 22 may be inverted, i.e., with a cam path 22 formed in the rack or in the pinion and a hook 9 secured to the housing 2,21.

It is apparent from the above description how the device 1 according to the invention can solve the technical problem addressed by the invention.

In fact, it allows to hold the pinion 5 in two preset conditions or stable positions without requiring electric power to be continuously supplied to the thermoactuator 3, since the latter needs to be powered only for the time strictly necessary for switching the angular position of the rotary element 5,51.

It follows that, from an energetic viewpoint, the consumption of the device 1 is much lower, all conditions being equal, than that of the above-mentioned prior-art devices, in which the thermoactuator must be kept powered as long as the pinion needs to be held in the stable condition.

It must be underlined that this result is attained for both stable conditions of the device, i.e., for both stable angular positions; hence the advantage in this respect is doubled.

It must also be pointed out that the bistable engagement according to the invention, as well as the variants thereof that will be discussed hereafter, are robust and can withstand high stresses or forces in the opposite direction in the angular working position even without exciting or powering the actuator 3, such a high holding force being obtained, in particular, with a small device.

This is an important aspect, because opposite stresses or forces may be due to a strong air flow, in the case of a device 1 associated with a flap, or to high pressure or a strong opposite liquid flow, in the case of a device used as a valve obstructor, etc.

It follows that the device 1 combines all the above-mentioned advantages derived from the use of thermal actuators, without the drawbacks due to the necessity of a continuous electric supply.

The device 1 is small, in that the hook-shaped element 9 and/or the path 22 are substantially contained within the dimensions of the rack 6 and/or of the pinion 5; in particular, such an arrangement limits the outer dimensions to those strictly necessary, since they are determined by the travel of the rack 6 and hence of the thermoactuator 3.

In other words, it must be pointed out that the device according to the invention does not require increased overall dimensions compared with other rack-type devices known in the art.

Because of at least some of these features, as already explained, the device 1 turns out to be compact and precise.

Of course, the invention may be subject to a number of variations with respect to the description provided so far.

As aforesaid, it may generally be thought of replacing the engagement system consisting of the hook 9 and the groove 22 with other releasable engagement means associated with the rack.

One possible variant of the invention is shown in FIGS. 11 to 33, wherein for simplicity any elements which are similar and/or equivalent to those already described are designated by the same reference numerals with the addition of 100; thus, for example, the device of this variant is designated as a whole 101 and comprises a container shell 102 that houses its components, closed by a cover 121.

In substance, this embodiment of the invention differs from the preceding one in that the locking mechanism associated with the first transmission member 106, i.e., a rack or another sliding element cooperating with the second rotary or angularly-movable transmission member 105, i.e., the pinion 105, comprises a locking or hooking element 109 which is movable in a floating or horizontally-pivoted or oscillating manner.

The structural and functional characteristics of said element will become more apparent in the light of the following description; they are numerous, and therefore, to avoid providing a limiting definition of said element, it will hereafter be defined, for brevity, as oscillating element 109 and/or hooking element 109 and/or oscillating hooking element 109.

The oscillating hooking element 109 is also movable within the shell 102, which is preferably connected to or associated with the rack 106, in particular by means of a spring 108 and/or mutual engagement means, as will be explained below.

According to the preferred example, one end of the spring 108 is secured to a first peg 111 on the rack 106, whereas the other end is secured to a second peg 112 on the oscillating element 109, which is thus subject to the elastic return force of the spring 108.

Advantageously, the oscillating element 109 has an appendix 113, in particular a downward-projecting protuberance, which guides the oscillating element 109 along a groove or guide 123 of the housing 102,121, preferably located on the bottom of the shell 102, so as to follow or guide the movements of the oscillating element.

The oscillating element 109 is provided with a first tooth or hook 114 at its rear end, i.e., the one facing towards the thermoactuator 103, and at the other end it has a second tooth and/or pivot 115, both substantially facing towards the rack 106; the first tooth 114 engages against a chamfer or engagement seat 116 at the back part of the rack 106 for stopping or engaging in an advanced condition, whereas the second tooth or pivot 115 is used as a further hooking element and/or for causing the oscillating element 109 to oscillate, particularly in order to allow the first tooth 114 to be disengaged.

To allow relative movement between the oscillating element 109 and the rack 106, the bottom edge of the latter is lowered by a cavity or seat 118 that ends at the front with a protuberance 118a; the oscillating element 109 also has a front end 119, configured with a rounded tip 119a and an inclined surface 119b which, in the operating condition that will be better described below, promote the oscillation and/or movement of the oscillating element 109 upwards and/or downwards, as will be described below.

For this purpose, the end 119 cooperates with a cam profile or seat 120 on the bottom of the container shell 102. Advantageously, said cam profile comprises a concave lower portion 120a and a convex upper portion 120b.

Furthermore, in the housing 102, 121, and in particular in a side wall of the container shell 102, there is a portion or protuberance 122, preferably square in shape, which couples to the cavity 118 of the rack 106, in particular for creating a sliding guide for the rack 106; said portion or protuberance 122 comprises a seat 122a adapted to be coupled to the second tooth 115 of the oscillating element 109.

In accordance with a preferred embodiment, the seat 122a and the second tooth 115 have a semicircular or anyway rounded profile, to promote the relative movement due to the oscillations of the element 109.

However, the second tooth 115 and the seat 122a may have a different shape (e.g., a triangle resting on a vertex), so long as it can allow relative movement while the element 109 is oscillating.

This first variant 101 of the invention operates as follows. When the thermoactuator 103 is electrically powered as already explained for the preceding case (to which reference should be made for brevity), the stem 132 moves from the retracted condition (visible in FIGS. 12-13, 16 and 22) to the advanced one (FIGS. 14-15, 17-21).

As can be seen, in such initial or retracted condition the oscillating hooking element 109 is positioned in such a way that its rounded end 119 is pivoted into the concave lower portion 120 of the cam profile 120. At the opposite end, the first tooth 114 of the oscillating hooking element 109 rests against the bottom edge of the rack 106.

It can be noticed that in said initial condition the oscillating hooking element 109 is substantially horizontal, in particular facing towards the housing 102, whereas the spring 108 is idle (i.e., not under tension) and extends slightly inclined between the pegs 111 and 112.

Figure 23:
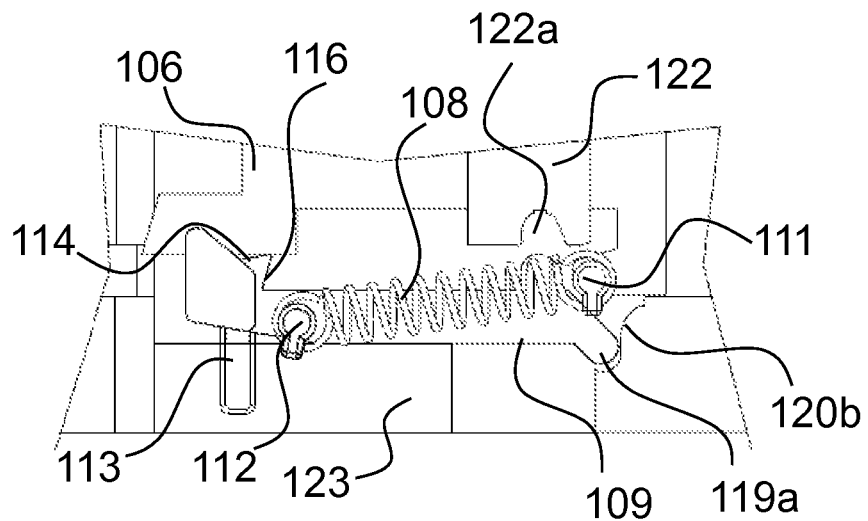
FIGS. 23-29 are enlarged views of a detail of FIGS. 16-22 in corresponding operating steps.

In this initial condition, the oscillating element 109 looks as shown in FIGS. 16, 23, i.e., so positioned as to not engage the rack 106, which is thus free to move, in particular the hooking end 114 resting on and being free to slide along the bottom profile of the rack 106.

Figure 24:
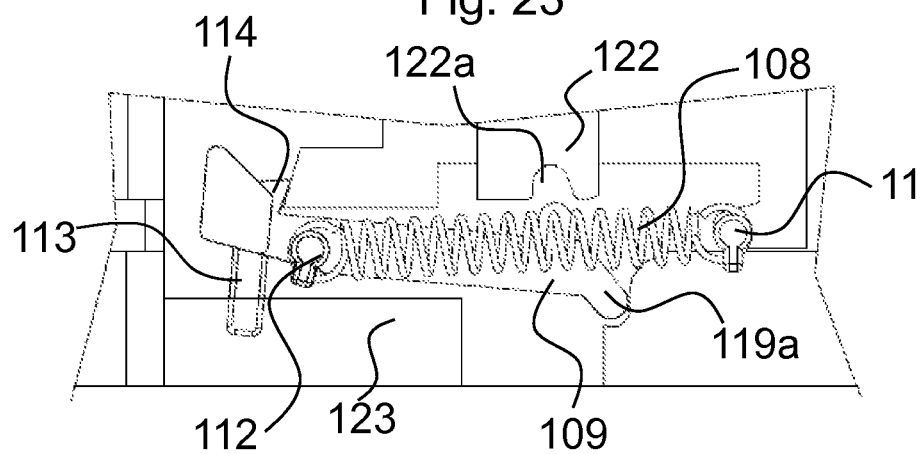

When the actuator 103 is powered, the stem 132 advances and consequently pushes the rack 106; following this movement, the rack overcomes the first tooth 114, which consequently oscillates upwards, i.e., moves, engaged with the seat 116 (as shown in FIGS. 17 and 24), integrally with the rotating hooking element 109 pivoted to said rounded tip 119a, which is coupled to the concave portion 120a of the cam profile 120.

This rotation is determined by the force of the spring, which is extended and pulled by the advancing rack 106, until it arranges itself into a substantially horizontal position.

In this step, the rear chamfer or seat 116 of the rack engages with the first tooth 114 of the hooking element 109 to hold the rack 106; subsequently, the actuator 103 is deactivated, and its stem 132 tends to go back under the return action of the spring 133 of the actuator 103.

The stem 132 being connected to the rack 106 by means of the coupling between its head 132a and the shank 106a, the rack moves integrally with the stem through the effect of the return force of the internal spring of the actuator 103.

Figure 25:
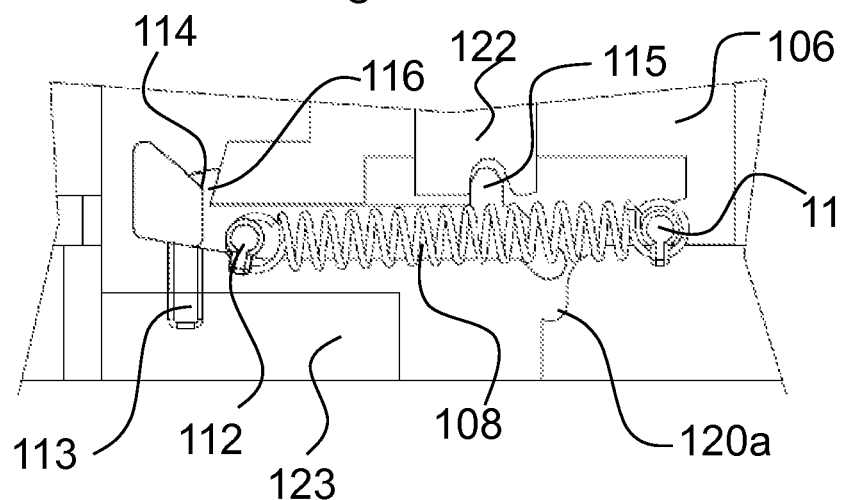

The rack 106 would tend to go back along with the stem 132, but it is prevented to do so by the engagement of its chamfer 116 with the engagement tooth 114, thus causing a counterclockwise rotation of the hooking element 109 pivoted to the tooth 114, until the element 209 is brought into a substantially horizontal condition towards the rack; in such condition, the second tooth 115 engages the seat 122a of the protrusion or protuberance 122 of the shell 102 that houses the device (cf. FIGS. 18 and 25).

Figure 26:
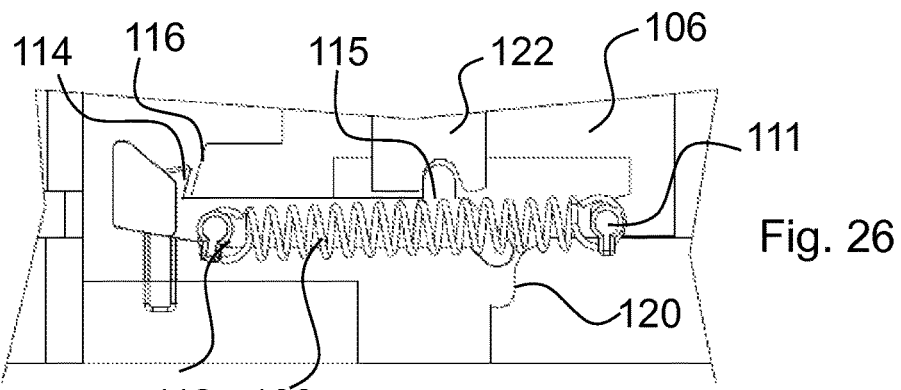
Figure 27:
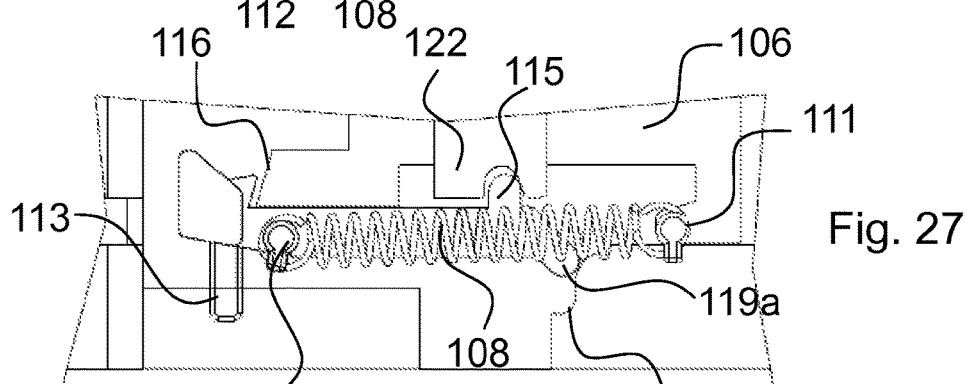

At this stage, the rack is stably locked in an advanced position, and the engagement of the second engagement tooth 115 with the seat 122a prevents the oscillating element 109 from translating in the horizontal direction (FIGS. 19 and 26).

It follows that, when the actuator 103 is activated again to unlock the system and bring the rack 106 back, the latter is pushed forwards (i.e., to the right with reference to FIGS. 20, 26) by the stem 132 being operated by the actuator 103.

The advance of the rack 106 further tensions the spring 108, the force of which, applied to the oscillating element 109 at the peg 112, causes the element 109 to make a rotary movement about the fulcrum provided by the rounded tip 119a of the element 109 resting on the upper portion 120b of the cam profile 120.

Figure 28:
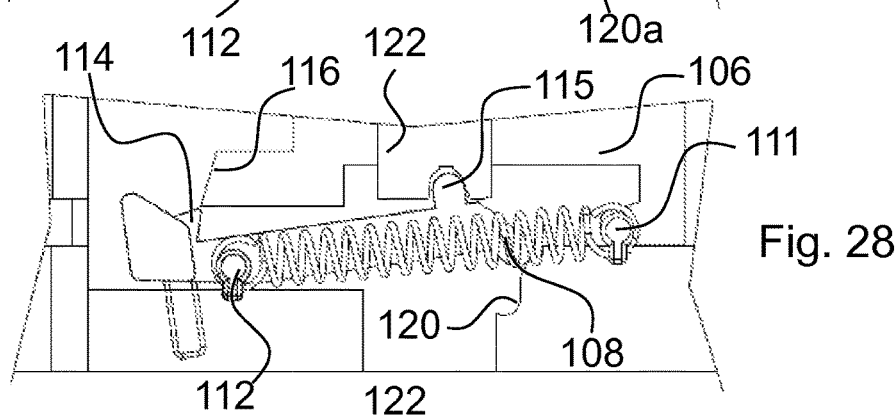
Figure 29:
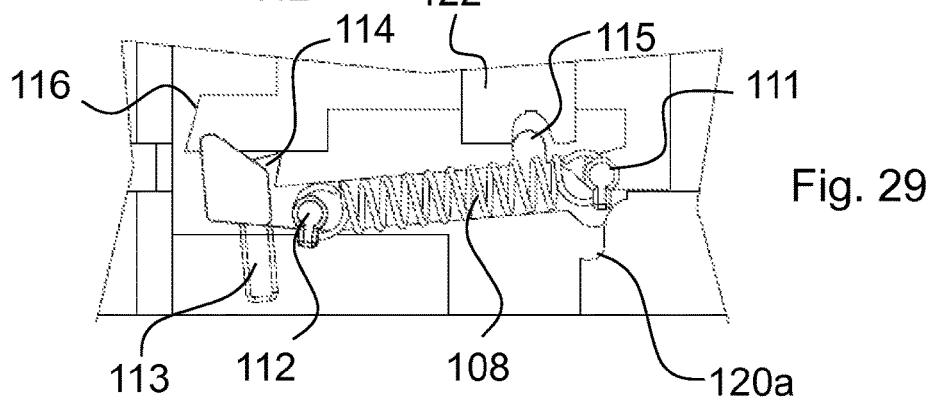
Figure 32:
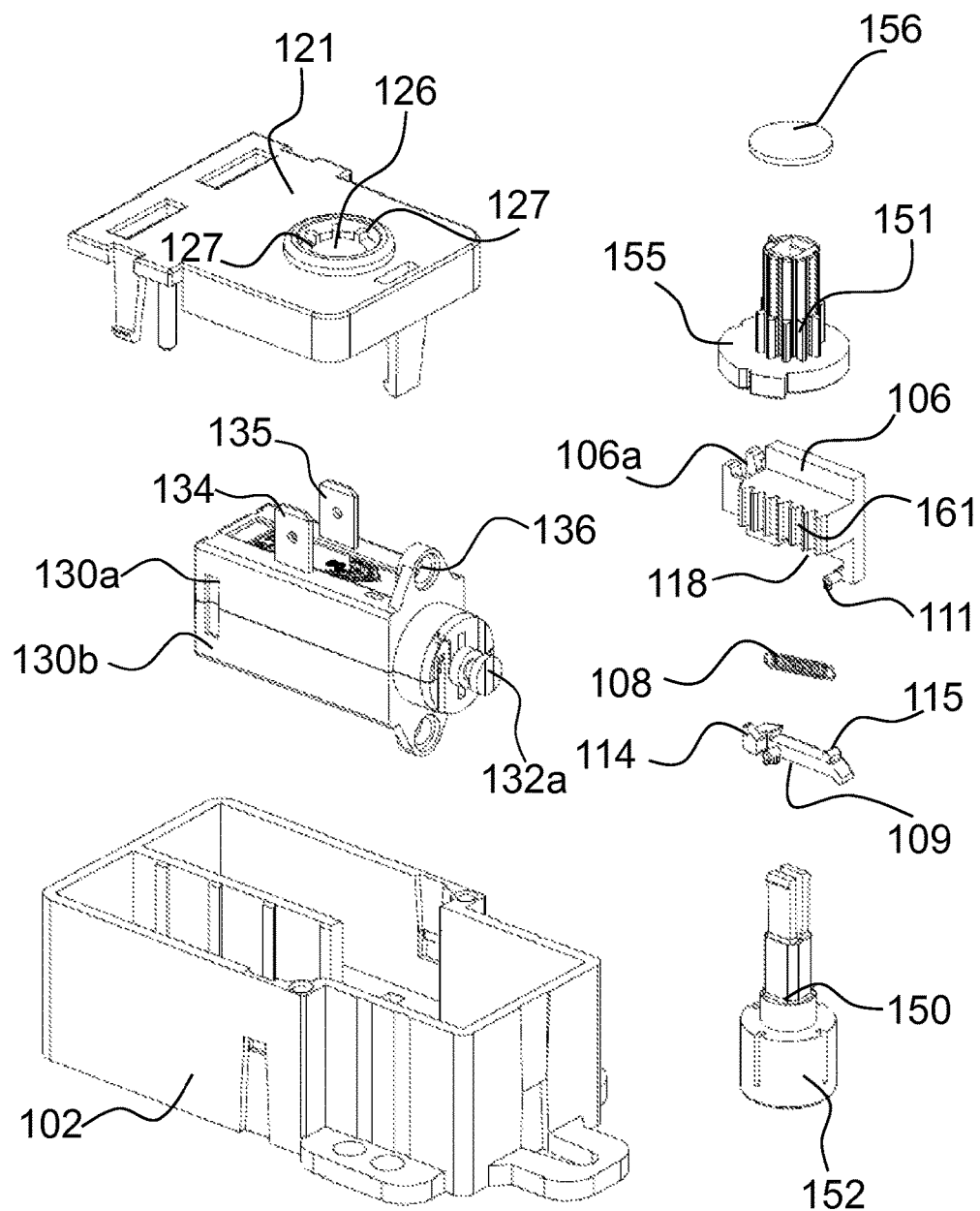
FIG. 32 is an exploded view of the embodiment of the device of FIGS. 11-31.
Figure 33:
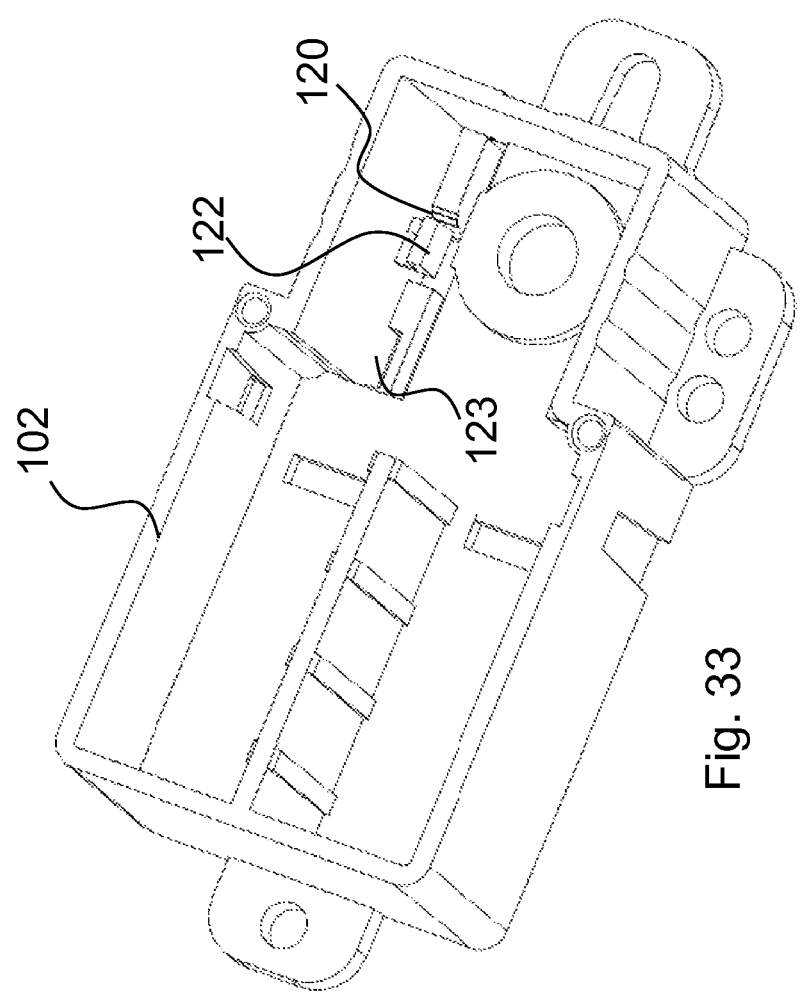
FIG. 33 is a view from a different angle of a detail of FIG. 32.
Figure 36:
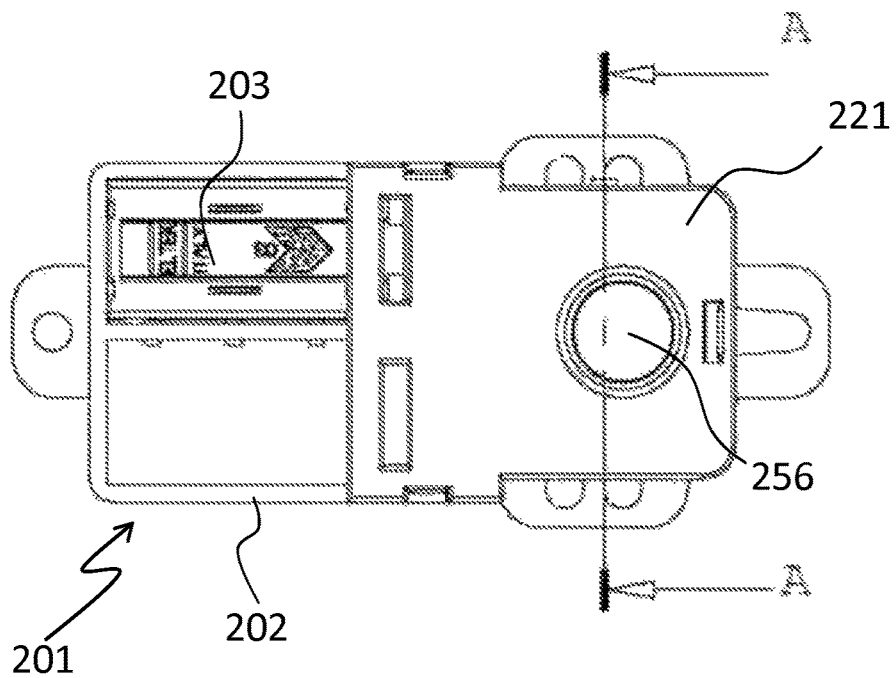
FIG. 36 is a plan view of the device of FIG. 34.
Figure 37:
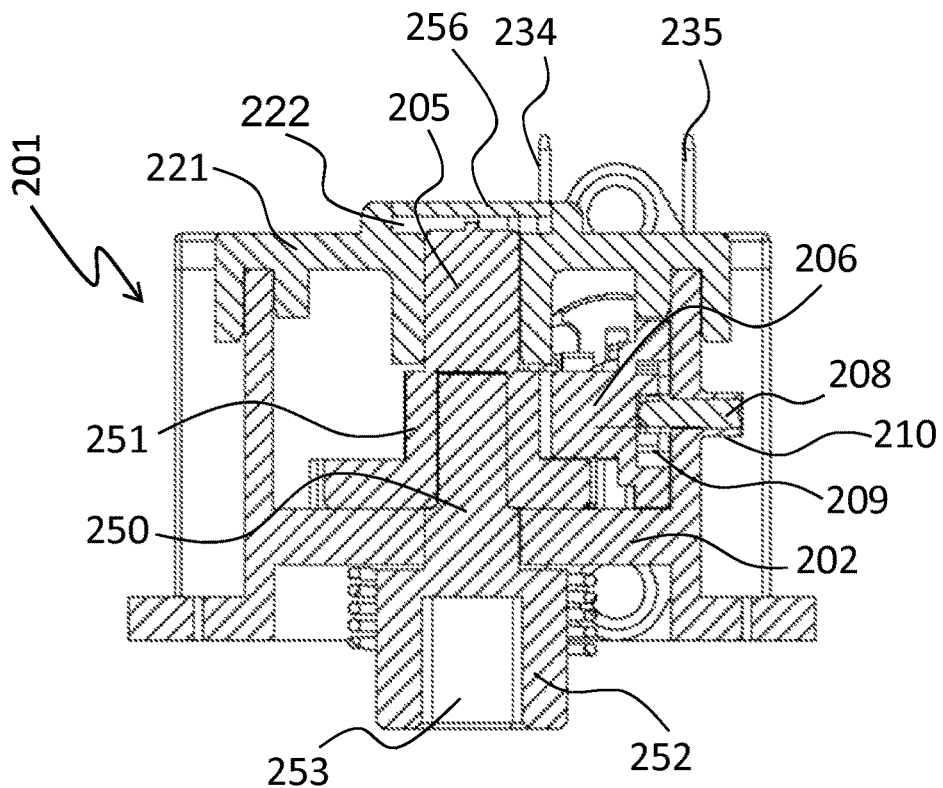
FIG. 37 is a sectional view along line A-A of FIG. 36.
Figure 41:
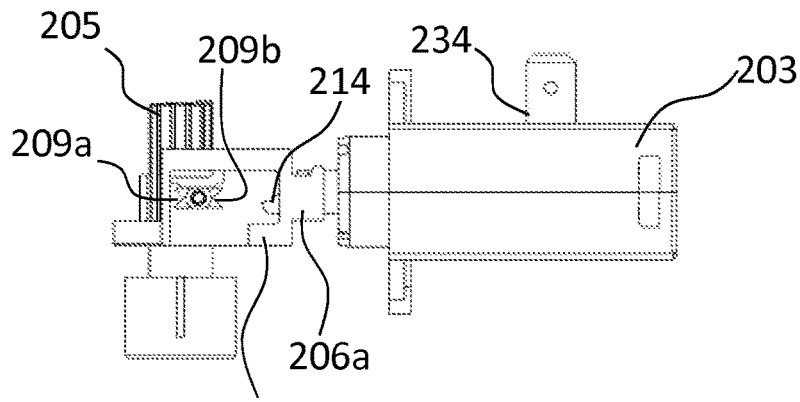
FIG. 41-44 show the details of FIGS. 35, 39 and 40 during respective consecutive operating steps.
Figure 42:
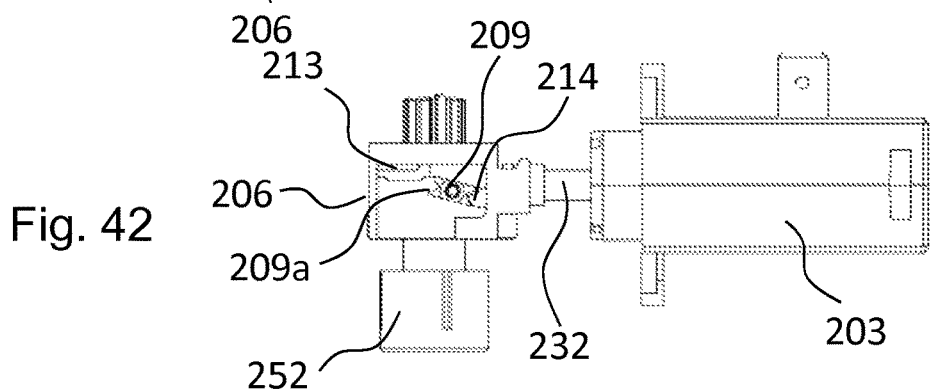

The rotation about the fulcrum 119a, 120b allows the engagement between the first tooth 114 of the oscillating element 109 and the rear chamfer 116 of the rack 106 to be released, leading to the position shown in FIGS. 21 and 28, so that the rack 106 is free to move backwards, when the actuator 103 is de-energized, to return into the final condition wherein it rests on the engagement tooth 114 (FIGS. 22 and 29).

For this purpose, at this stage the actuator 103 is turned off, so that the elastic return force exerted by its spring on the stem 132 is transmitted to the rack 106, causing it to return into the initial condition (FIGS. 16 and 23), ready to start a new cycle as just described.

It should be noted that the repositioning of the oscillating hooking element 109 into the initial condition is facilitated by the contact with the end protuberance 118a of the cavity of the rack 106, which cooperates with the inclined surface 119b of the tip 119 of the element, as schematized in FIGS. 22, 29, resulting in the rounded end 119a of the element 119 sliding along the cam profile 120 until it repositions itself into the concave lower portion 120a (FIGS. 16 and 23).

In this context, the toothed wheel 151 of the pinion 105, engaged with the toothing 161 of the rack 106, undergoes clockwise or counterclockwise rotations, depending on the movements of the rack, by preset angles that depend on the transmission ratio between the respective toothings, as already explained in the above description, to which reference should be made for brevity.

It must be underlined that, as in the previous example, the rack 106 is preferably integral with the stem 132, due to the effect of the coupling between the head 132a and the shank 106a, during both its forward and backward travels determined by the activation and deactivation phases of the actuator 103, wherein the rotational force of the pinion 105 is proportional to the force with which the rack 106 is pushed forwards by the actuator 103 and to the force with which it is made to return by the spring associated with the stem 132. The rotation of the pinion 105 is transmitted to a yielding mechanical member (not shown in the drawings), coupled to the device 101 at the base 152 of the pin, which is for this purpose equipped with a polygonal cavity 153 for coupling to a shaft or a pin or the like.

As can be easily understood, from the functional viewpoint this variant of the device of the invention is similar to the previous example; therefore, it attains the same results in terms of low energy consumption, which come from the fact that the thermoactuator 103 essentially operates only for the time necessary for moving the rack 106 from the retracted condition to the advanced condition, and vice versa.

In such conditions the device 101 is stable and reliable, so that it can be used for many applications which are not limited to household appliances, but in general include any case wherein a mechanical member must be actuated angularly or linearly between two stable positions.

In this context, it must be stressed that, as in the preceding case, these advantageous effects are obtained with limited outer dimensions, since the elements concurring in holding the rack 106 and/or the pinion 105 in stable conditions are arranged inside the shell 102 and hence do not require increased overall dimensions of the device.

In particular, it must be pointed out that, also in this embodiment of the device of the invention, the means concurring in holding the rack 106 in said stable conditions, i.e., the spring 108, the oscillating element 109 with the teeth 114 and 115, the chamfer 116, the seat 122a in the protrusion 122 of the container shell 102, are arranged at or alongside the rack itself, so that the outer dimensions of the device 101 are de facto only dependent on the travel of the thermoactuator 103.

Based on this teaching, many variants of the invention can be conceived by modifying the means concurring in holding the device in the above-mentioned stable conditions.

In order to make this concept more easily understood, reference should be made to FIGS. 34-44, which illustrate another variant of the device of the invention, and wherein, for simplicity, any parts which are similar and/or equivalent to those already seen in the first example are designated by the same reference numerals with the addition of 200; thus, for example, the device of this variant is designated as a whole 201 and comprises a shell 202 that houses its components, closed by a cover 221.

In substance, this second variant of the invention differs from the preceding ones in that the mechanism that locks the first transmission member, i.e., the rack 206, comprises a stop element consisting of a profiled rotary head 209 associated with a pin 208; the head 209 being preferably provided with a stop or engagement profile or seats or protuberances, in particular a profile comprising four points and/or four lobes, which may be defined, for simplicity, "butterfly profile".

The pin 208 associated with the stop head 209 preferably extends into an aperture or hole 210 of the housing or shell 202, passing through the side wall thereof (FIG. 37), although one may employ a pin 208, integral with the shell 202, extending into a seat or hole of the stop element or head 209.

For brevity's sake, the following will only tackle those aspects which mostly differentiate this variant from the other ones, whereas for all common aspects reference should be made to the above descriptions of the previous examples.

In particular, as can be seen in FIG. 40, the rack 206 in this case has, in addition to the head 209, also a seat or aperture 215 on the side opposite to that of the teeth 261, in which aperture 215 there are a first and a second rotation and/or engagement guides 213, 214 cooperating with the engagement head 209. Preferably, the engagement head 209 is made as one piece with the pin 208, which is free to rotate about its axis.

The head 209 is housed in the seat 215; when in operation, it comes in contact with the rotation and/or engagement guides 213, 214 with which it cooperates: during the motion of the rack 206 generated by the actuator 203, in fact, the seat 215 preferably moves relative to the pin 208 and to the stop head 209.

More in detail, the preferred version of the head 209 comprises two opposite ends protruding outwards and provided with two cutouts or seats 209a, 209b, e.g., two V-shaped cutouts.

The rotation guides 213, 214 comprise coupling portions to be coupled to said cutouts 209a, 209b of the head 209, which are adapted to allow for mutual engagement between the parts in order to cause a rotation or to stop the rotation of the head 209, as will be described more in detail hereafter.

FIGS. 41 to 44 provide a better view and understanding of the operation of the bistable engagement means of this embodiment.

With reference to an initial condition (FIG. 41), wherein the thermoactuator 203 is off and the stem 232 associated therewith is retracted through the effect of the elastic return force of the spring inside of it, the engagement head 209 is horizontal and adjacent to the rotation and engagement guide 213 located in the upper portion of the aperture 215.

When power is supplied to the actuator 203, the stem 232 associated therewith moves forwards and the rack 206 is pushed towards the pinion 205 (i.e., to the left in FIG. 42), until the cutout 209b of the engagement head 209 engages the second rotation and engagement guide 214 which is present in the aperture 215 of the rack 206, thereby determining a first partial rotation of the engagement head 209, in particular by a predefined number of degrees.

When power is no longer supplied to the actuator 203, the stem 232 moves backwards through the effect of the return spring associated therewith, thereby moving the rack 206 towards the actuator 203.

Figure 43:
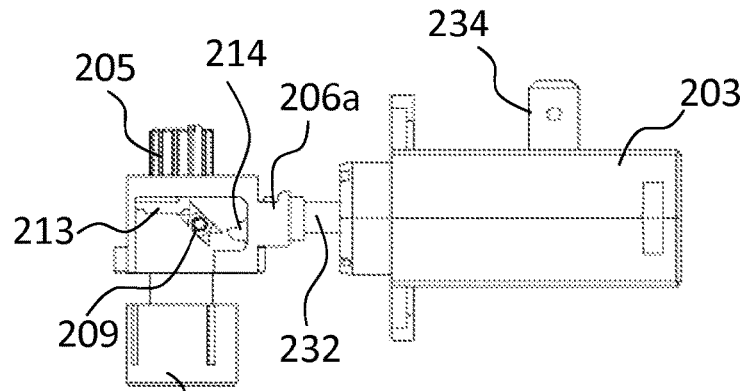
Figure 44:
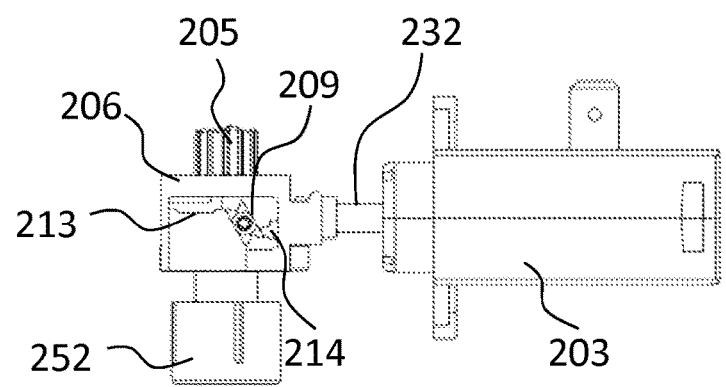
Figure 45:
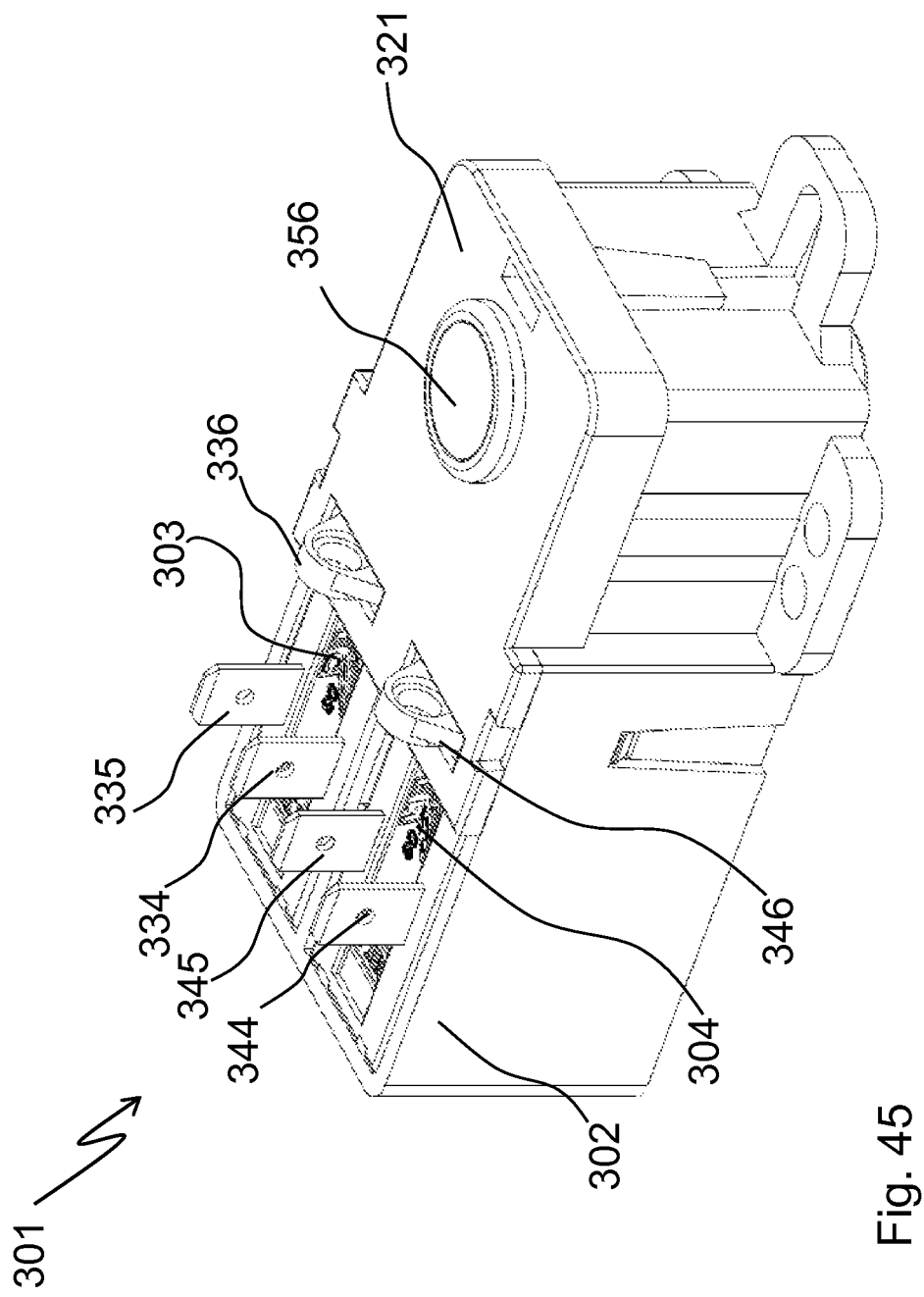
FIG. 45 is a perspective view of a further embodiment of the actuator device according to the invention.

The backward movement of the stem 232 is stopped in the stable position of FIG. 43 through the effect of the interference between the engagement head 209 and the other rotation and engagement guide 213, in particular in said angle portion.

In order to remove this locked condition, the thermoactuator 203 is activated again; as a consequence, the stem 232 moves forwards, thus moving the rack 206 until the second rotation guide 214 pushes against the side of the engagement head 209, thereby causing it to rotate by a few degrees into a predefined position (clockwise with reference to FIG. 44) and orienting it beyond the first guide 213, i.e., in such a way that said cutout 209a is not oriented towards the rotation and engagement guide 213.

At this point, the thermoactuator 203 is deactivated and the stem 232 returns into the retracted condition (through the effect of the return action of the spring associated therewith), thus moving the rack 206 backwards.

The engagement head 209 is then subject to further side thrusts by the guides 213 and/or 214, which determine a further rotation thereof, so that said head 209 becomes aligned with the first rotation guide 213 and returns into the initial condition (shown in FIG. 41), ready for starting a new cycle as just explained.

From the above description one can understand that also this variant of the invention attains the same advantages as the preceding examples in terms of energy consumption reduction.

In particular, it must be pointed out that the device is compact and its outer dimensions are rather small, in that they depend, in practice, on the travel of the thermoactuator 203 and of the associated stem 232, since the elements concurring in holding the mechanism in the two stable conditions discussed above are housed in the container shell 202, alongside the rack 206.

Similar considerations also apply, mutatis mutandis, to cases wherein devices with multiple thermoactuators are used, e.g., when in the same shell there are pairs of thermoactuators arranged side by side.

This is the case of the other variants of the invention referring to FIGS. 45 to 61, which illustrate different embodiments obtained by observing this principle. We will start for simplicity from FIGS. 45-54, wherein, whenever compatible and/or possible, the same reference numerals of the items already discussed in the first example are used, with the addition of 300.

As can be seen, the device 301 comprises in this case two thermoactuators 303, 304, each one comprises a housing of its own consisting of two external half-bodies 330a, 330b; 340a, 340b accommodating the thermal assembly 331, 341, which contains the expandable wax; each actuator 303, 304 preferably comprises fastening means, consisting in this example of symmetrical fastening flanges 336, 346, wherein each fastening element or flange is preferably formed in a respective half-body 330a, 330b; 340a, 340b.

Each thermal assembly 331, 341 exerts a thrust on a corresponding stem or shaft 332, 342 coupled thereto; for this purpose, each assembly comprises a thrust element 331a, 341a, which is activated by the heat-expandable material M contained in the respective chamber 331b, 341b, thus coming out of the assembly and pushing the stem 332, 342 forwards.

The stem 332, 342 has an elongated shape and is associated with a spring 333, 343, useful to ensure the elastic return of the corresponding actuator 303, 304 into the idle condition when it is turned off and the wax therein has cooled down; the spring 333, 343 pushes said stem 332, 342, which in turn pushes the thrust element 331a, 341a towards the inside of the chamber 331b, 341b.

To this end, the actuators 303, 304 are preferably equipped with at least one respective pair of electric contacts 334, 335; 344, 345 to be connected to a power supply source, as is the case of household appliances, for example, wherein the actuator device 1 according to the invention can be used to advantage.

The thermoactuators 303, 304 are arranged side by side inside the shell 302, in particular with their respective axes and/or working directions defined by the direction of movement of the stems 332, 342 and/or of the racks 306, 307, preferably with the fastening flanges 336, 346 projecting upwards and downwards and extending through respective apertures 320 provided on the cover 321 that closes the shell 302 and on the bottom of the latter; said fastening element 336 of the thermoactuators 303, 304 may however be absent or be of a different type, resulting in a different coupling or engagement with the housing or shell 302.

According to the non-limiting example shown in the drawings, the shell 302 has a wider rear portion 302a that houses the thermoactuators 303, 304 and a front portion 302b that houses a rotary or angularly-movable transmission member, called pinion 305 for simplicity.

The latter, as can be clearly seen in FIGS. 49-53, advantageously consists, in this embodiment, of a first central element or pin 350 for supporting and/or fitting a toothed wheel 351; it should be considered that said toothed wheel 351 may have teeth on only a portion of its circumference, preferably on two or more portions, thus being divided into distinct sectors as shown in the drawings, wherein the circumference of the toothed wheel 351 comprises two opposite or specular or semicircular sectors 351a, 351b.

The pin 350 of the pinion 305 has a base 352, preferably having a greater diameter than the pin itself and/or than the toothed wheel 351, within which a coupling or fitting element 353, such as a polygonal or square cavity 353, is formed for coupling the rotary pinion 305 to an output shaft or another member driven by the externally associated actuator device 301 (not shown in the drawings), such as a shaft having at least one end with a shape complementary to the seat 353, e.g., polygonal or square.

The toothed wheel 351 has, at one end thereof facing the base 352 of the pin 350, a disk or stop element 354, the edge of which has a series of cutouts or seats 355', 355" the function of which will be described in detail later on.

Preferably, in the cover 321a seat 326 is formed for housing an insert 356 of the cover 321; in accordance with a preferred embodiment, said insert is made of transparent material, such as a transparent thermoplastic material or glass, to allow seeing or checking from outside the cover 321 the angular position of the upper end of the pinion 305 and/or of the toothed wheel 351. To this end, suitable notches or protuberances or references 327 are also present at the periphery of or inside the seat 326 of the cover 321, which cooperate with a reference provided on the pinion 305 and/or on the toothed wheel 351 to indicate the angular position thereof. For example, a reference on the pinion may consist of a suitable notch or protuberance, or possibly an excitation element for a position sensor.

Said excitation element may be, for example, a cam element, in particular for exciting an electric contact, or a magnetic element or a permanent magnet, in particular for exciting a magnetic detection sensor, or a reflective element, or an element adapted to interrupt or divert an optical beam, in particular for exciting an optical detection sensor.

The position of the pinion 305 may advantageously be detected through the transparent insert 356, whether visually or through optical means (e.g., photocells, luminous rays, etc.), not shown in the drawings, particularly for making checks during the production stages and/or in operation.

According to a possible variant, said insert 356 acts as a closing element for protecting the pinion 305 against dust, external agents or various impurities which might stop the rotation of the pin and cause damage to it.

It must however be pointed out that the insert 356 may be absent, and the upper end of the pinion 305 and/or of the toothed wheel 351 may pass through or be housed in said seat 326, so as to be visible and/or detectable from the outside.

The toothed wheel 351 of the pinion 305 meshes with a pair of racks 306, 307, i.e., transmission elements which move in a substantially linear manner, arranged on opposite sides thereof, the racks 306, 307 being symmetrically or specularly arranged with respect to the axis of said pinion 305 or toothed wheel 351; the racks 306, 307 are preferably guided, in particular by at least a portion of the housing 302,321, e.g., the side walls of the front portion 302b of the shell 302 and those of the cover 321, against which they abut.

To this end, preferably on the side opposite to that of their teeth 361, 371, the racks 306, 307 have at least one respective guide 360, 370, such as pairs of guides 360 and 370, which facilitate their sliding action towards or relative to the shell 302 and/or the cover 321, e.g., the side walls of the shell 302 and of the cover 321.

In the front part 302b of the shell 302 there is also an elastic stop or engagement element 310, such as a leaf spring 310, preferably arranged transversally to the direction of movement of said rack elements 306, 307 or thermoactuators 303, 304 and located in proximity to the stop disk or element 354 of the pinion 305; the elastic element or spring 310 has a central rib or protuberance 310a, the shape of which is conjugated to that of the cutouts or seats 355', 355" of the disk 354, or an element 310, 310a shaped in a manner such as to engage said cutouts or seats 355', 355" for the purpose of holding the disk 354 and/or the pinion 305 in substantially stable positions. It should however be noted that the elastic element or spring 310 may act by friction alone upon the disk 354, without the latter having any cutouts.

The device 301 according to the invention operates as follows. In order to turn the pinion 305 clockwise with reference to a top view of the device 301 (like those of FIGS. 45, 46), the rack 306 is moved and/or pushed and/or advanced by the corresponding thermoactuator 303.

The latter is then electrically powered through the contacts 334, 335, which heat up the PTC electric resistor 338 arranged inside the thermal assembly 331. The electric current supplied through the electric terminals 334, 335, 344, 345 to the resistors 338 causes the latter's temperature to rise; as a consequence, the assemblies 331, 341 in contact therewith are heated as well.

This causes the expansion of the heat-expandable material M contained in the thermal assemblies 331, 341, which in turn cause the thrust element 331a to move and operate the stem 332, which comes out of the body 330 of the thermoactuator 303 against the countering force exerted by the spring 333, thus pushing and moving the rack 306.

The travel of the rack 306 is thus substantially equal to that of the corresponding thermoactuator 303 (typically a few millimeters, e.g., in the range of 4 mm to 12 mm or even more), and rotates the pinion 305 by a preset angle as a function of the transmission ratio of the toothing 351, e.g., an angle between 30 degrees and 180 degrees, preferably between 45 degrees and 90 degrees.

Preferably, for obtaining a 90 degree rotation a rotary element or pinion 5,51 with twelve 0.75 module teeth is used, whereas for obtaining a 50 degree rotation a rotary element or pinion 5,51 with twenty-two 0.75 module teeth is used.

The movement of the rack 306 being pushed determines the rotation of the pinion 305 by an angle such that the cutout 355' is released from the rib or protuberance 310a of the spring 310 and the second cutout 355" engages with said protuberance 310a.

Said engagement, which is a releasable one, allows holding the pinion 305 stably in the achieved condition, even when the thermoactuator 303 is de-energized. It should be noted that the means for mutual engagement or for holding the stable position may also be of another type suitable for this purpose, to be associated with the pinion 305 and/or with the racks 306, 307; for example, the pinion 305 and/or the rack 306, 307 may be provided with a protuberance 355' and at least one elastic element or spring 310 with a seat 310a (or one may exploit the friction exerted on the pinion 305 by the spring 310).

In fact, as already explained, when the thermoactuator 303 stops being electrically powered, the wax inside the thermal assembly 331 cools down and reduces its volume; consequently, the stem 332 moves backwards, pushed by the force of the elastic return spring 333.

When the stem 332 has gone back in, it no longer exerts a force on the rack 306 and on the pinion 305, which thus remains locked in position by the holding device 355, 310a, i.e., by the engagement between the cutout 355' and the rib 310a of the spring 310. This happens throughout the time required by the operation of the apparatus in which the actuator device 301 is being used.

Thus, for example, in the case of a washing agent dispenser of a household appliance like the one disclosed in the previously mentioned American patent, the time during which the pinion 305 is held in the locked condition depends on the wash cycle, and may therefore last some minutes (e.g., 5-15); consequently, the known thermoactuator must be kept powered as well all the time.

If a thermoactuator according to the invention is adopted, in such time interval neither of the thermoactuators 303 and 304 is kept electrically powered, resulting in an evident consumption advantage.

One important advantage offered by this device is that it does not require a position sensor to accurately define the working position, in that when moving the respective thermoactuator 3, 4 the direction of rotation is certain, and so is the position of the pinion 305.

When the pinion 305 must be moved in the opposite direction and/or returned to the previous position, in the device 301 the second thermoactuator 304 is activated which, by operating as described for the other thermoactuator 303, acts upon the second rack 307 through the stem 342.

The force applied by the shaft or stem 342 is such as to overcome the locking action exerted by said stop element, i.e., the leaf spring 310 with the disk 354 and its cutout 355', thus causing the pinion 305 to rotate backwards until the second cutout 355" of the disk 354 engages with the rib 310a of the spring 310.

In this frame, it must be observed that the return torque depends on the stronger force of the actuator, not on the (weaker) force of a spring.

In this case as well, the travel of the thermoactuator 304 is such as to ensure a preset angle of rotation of the pinion 305, depending on said transmission ratio between its toothing 351 and the toothing of the rack 306, 307.

Figure 46:
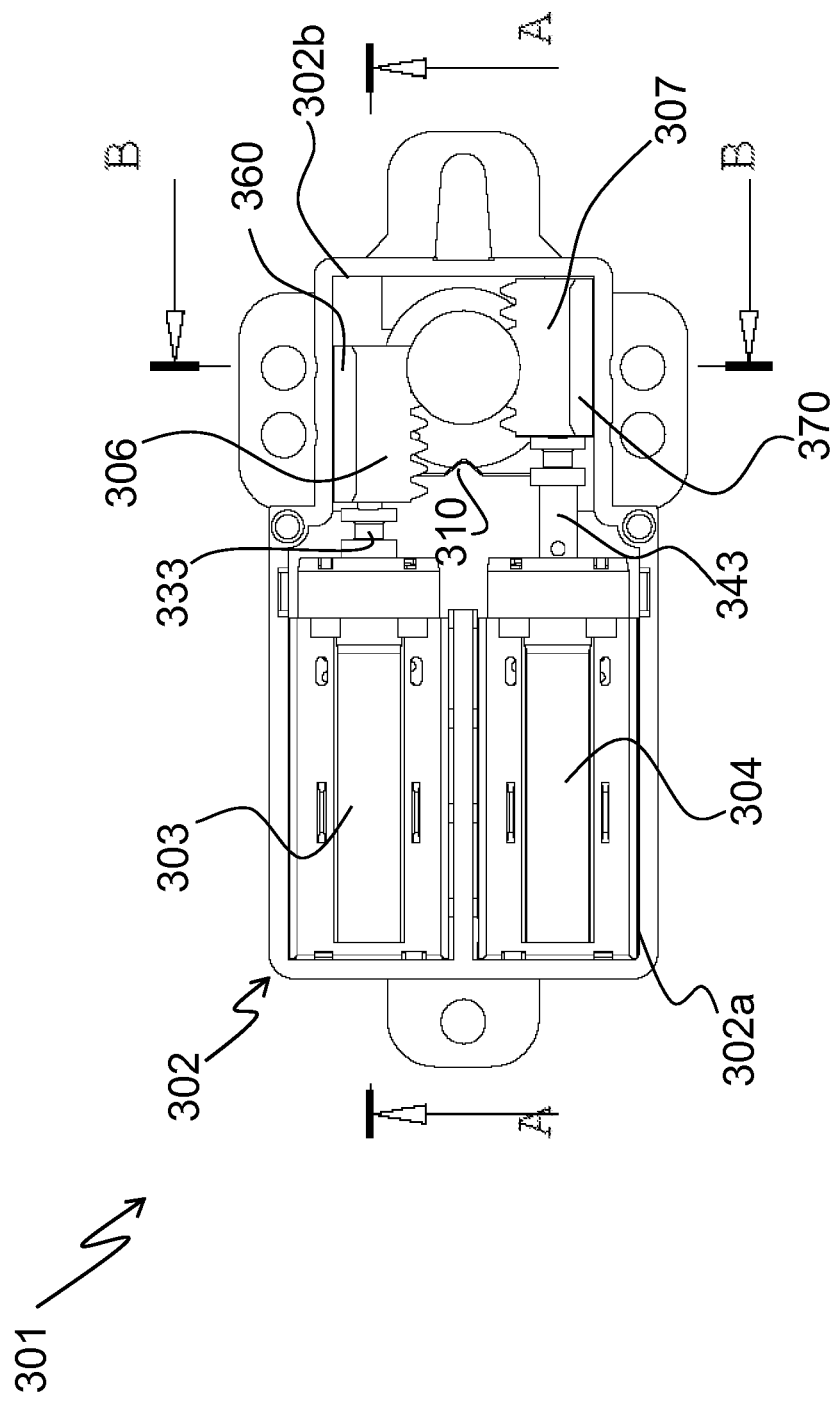
FIG. 46 is a plan view of the actuator device of FIG. 45, without the cover.
Figure 47:
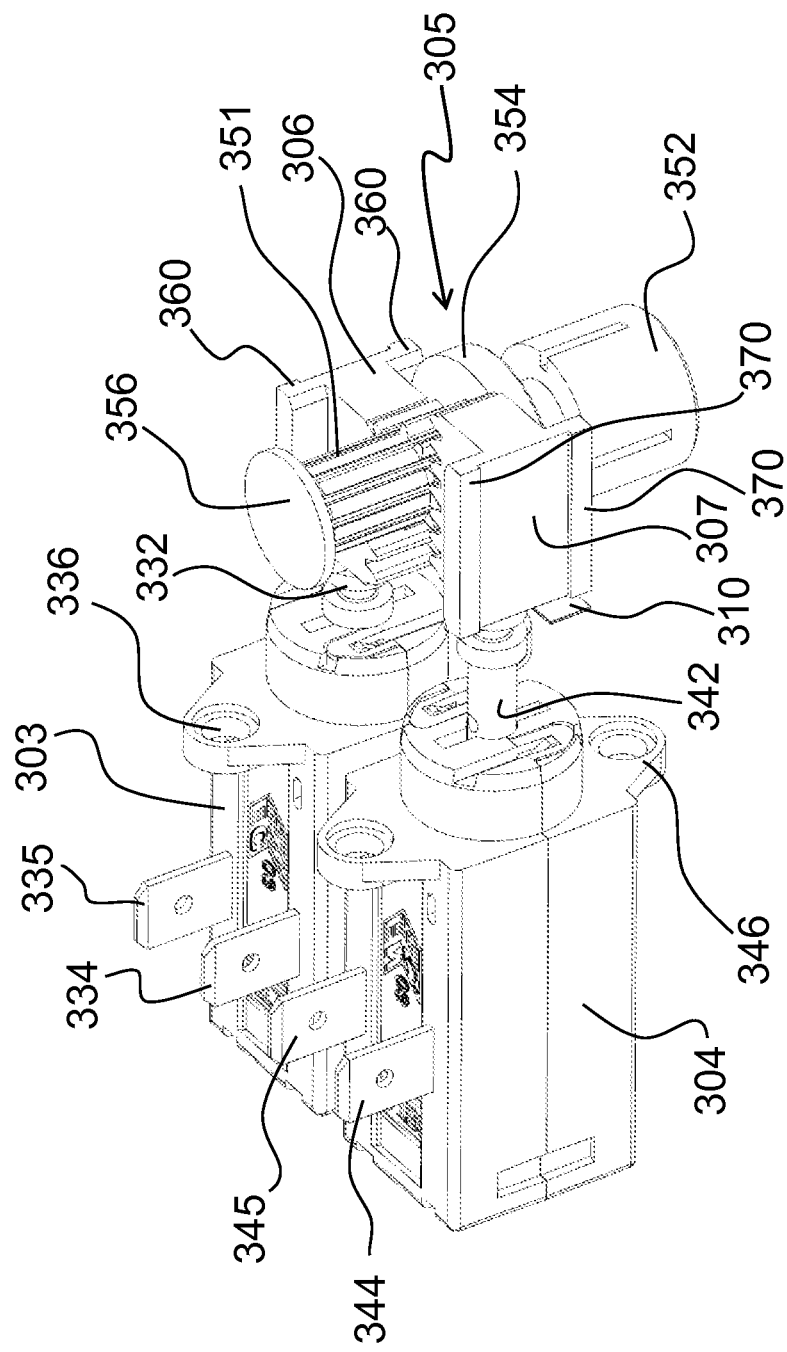
FIG. 47 is a perspective view showing some parts of the device of FIG. 45.
Figure 54:
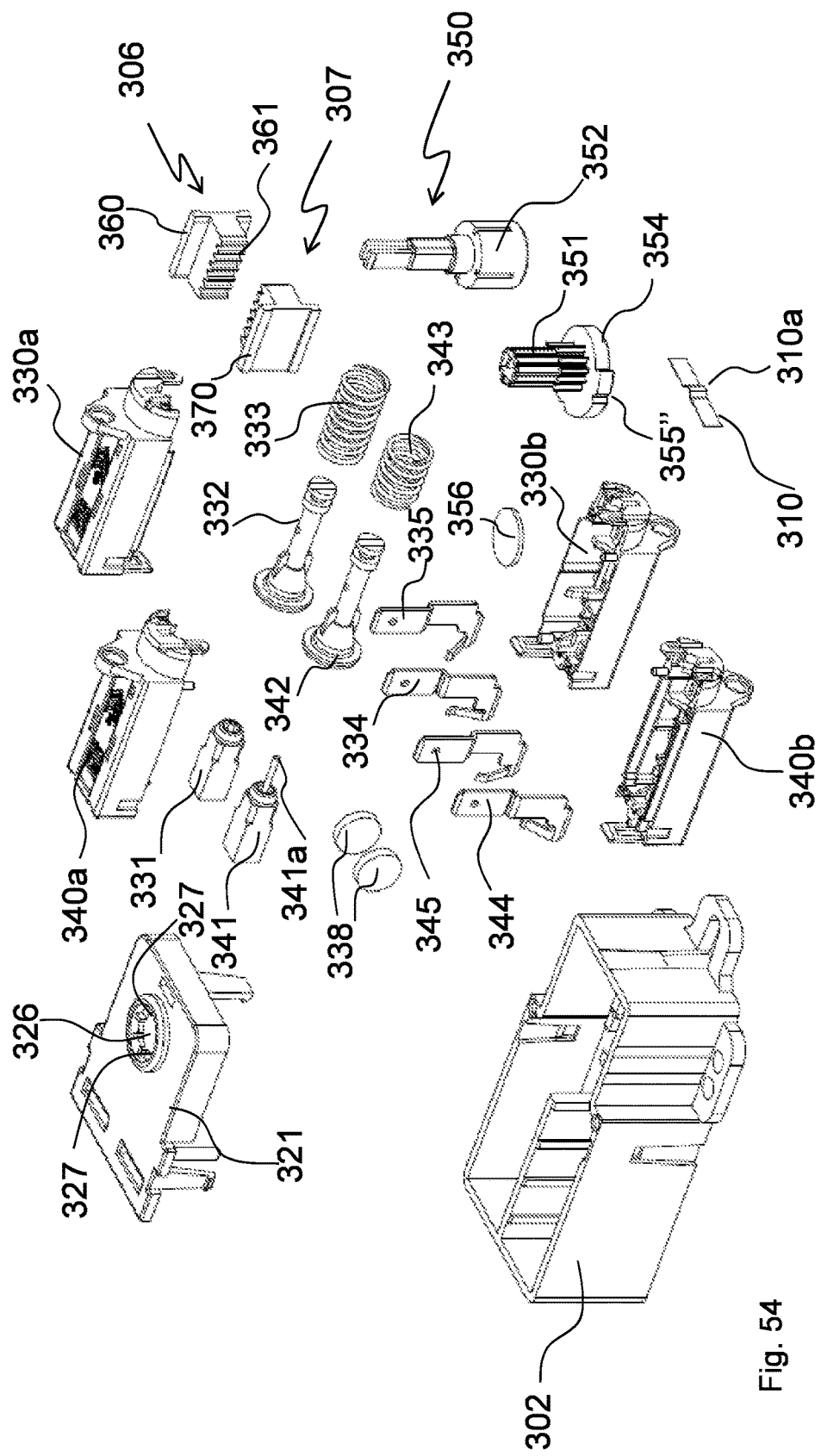
FIG. 54 is an exploded view of the device of FIG. 45.
Figure 56:
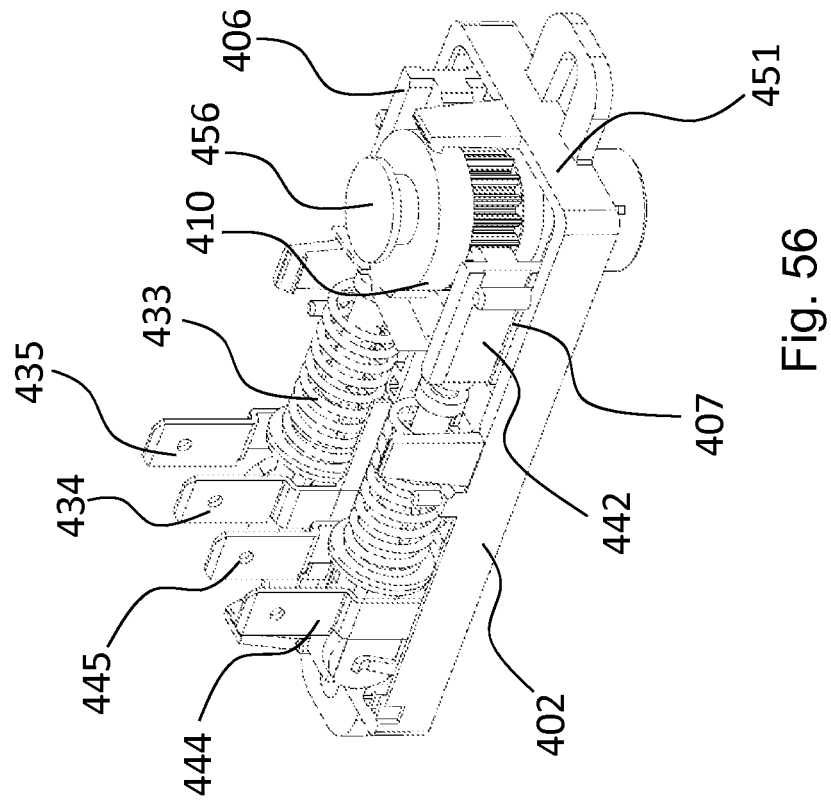
FIG. 56 shows the variant of the device of FIG. 55, with a part removed to make the internal parts visible.
Figure 55:
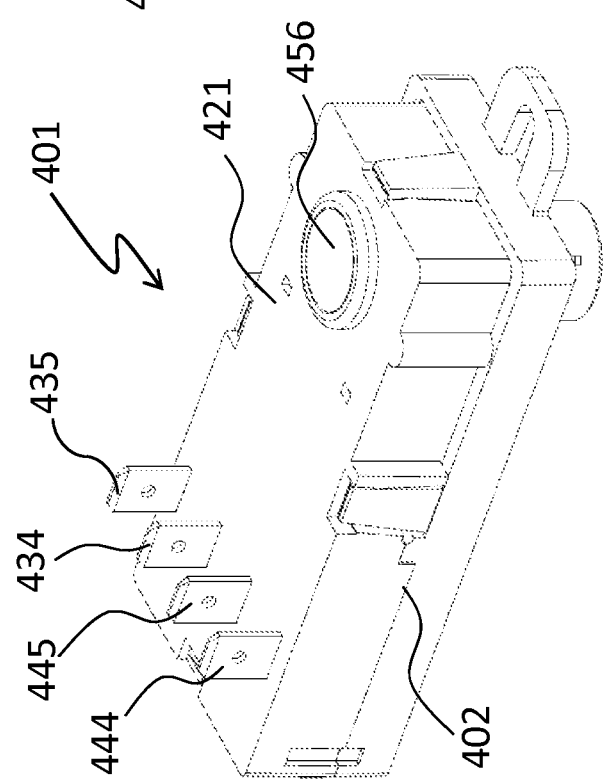
FIG. 55 is a perspective view of a further variant of the device according to the invention.

In this regard, it must also be pointed out that, in accordance with a preferred embodiment, the travel of the rack 307 (as well as that of the other rack 306) advantageously finds an end-of-travel abutment in the back wall of the shell 302 that houses the device 301, as can be seen in FIG. 46, though different abutments or stop elements or end-of-travel elements may also be conceived.

It should also be taken into account that said racks, which are preferably substantially equal or specular, have been preferably described herein as elements adapted to make a linear movement or travel, while also being able, if necessary, to make different movements, such as a slightly arched movement, under the action of said linear thrust exerted by the thermoactuators 303, 304, and still being able to engage and rotate the second rotary member or pinion 305, 351.

This feature, along with the stable arrangement of the actuators 303, 304 in the rear part 302a of the shell 302 and with the pinion-rack mechanism, allows to obtain a very accurate actuator device 301 that can be used for any application requiring very precise movements.

Also in this case, of course, once the stable advanced holding condition has been reached, i.e., when the cutout 355" has engaged the rib 310a of the leaf spring 310, the second actuator 304 is de-energized and its stem 342 returns into the retracted condition, also because of the action of the elastic return coil spring 343.

It follows that the pinion 305 can remain in that reached condition without power having to be supplied to the thermoactuator 304.

It is apparent from the above description how the device 301 according to the invention can solve the technical problem addressed by the invention.

In fact, as explained above, it allows to hold the pinion 305 in two preset conditions or stable positions without requiring electric power to be continuously supplied to the thermoactuators 303, 304, since the latter need to be powered only for the time strictly necessary for switching the angular position of the rotary element 305, 351.

It follows that, from an energetic viewpoint, the consumption of the device 301 is much lower, all conditions being equal, than that of the above-mentioned prior-art devices, in which the thermoactuator must be kept powered as long as the pinion needs to be held in the stable condition. This also applies to devices wherein the actuator is coupled to the rack.

It must be underlined that this result is attained for both stable conditions of the device, i.e., for both stable angular positions; hence the advantage in this respect is doubled.

It follows that the device 301 combines all the above-mentioned advantages derived from the use of thermal actuators, without the drawbacks due to the necessity of a continuous electric supply.

The device 301 is also compact, because the side-by-side arrangement of the thermoactuators 303, 304 minimizes its outer dimensions, for the pinion can advantageously be interposed between the racks 306, 307 associated with the respective actuator 303, 304; in other words, it can be stated that the outer dimensions of the device 301 according to the invention are only dependent on the dimensions of the two thermoactuators 303, 304, which are arranged side by side, and of the two respective racks 306, 307, which are also arranged side by side, in that the pinion can advantageously be positioned between them.

Furthermore, thanks to this arrangement of the actuators, the racks 306, 307 can advantageously be guided by the walls of the housing shell 302, which walls can also be used as abutment elements.

Because of at least some of these features, as already explained, the device 301 turns out to be compact and precise.

It should also be stressed that the side-by-side arrangement of the actuators advantageously facilitates the use of a single connector for supplying power to both of them. Of course, the invention may be subject to a number of variations with respect to the description provided so far.

For example, some of the engagement means 9, 109, 209, of the rack 6, 106, 206 described in relation to the examples with a single thermoactuator 3, 103 and 203 may be employed in the variant with the two thermoactuators 303, 304 of FIGS. 45-54.

Furthermore, it must be pointed out that other possible variants may be obtained by modifying the thermoactuators, e.g., modifying the outer shell and cover of the device, as well as the housing of the thermoactuator.

In substance, this embodiment differs from the preceding one in that the thermoactuators lack the outer housing, since the shell 402 and the cover 421 act as a housing themselves.

It follows, therefore, that the thermal units 431, 441 of the thermoactuators 403, 404 are directly housed in the shell 402, which for this purpose has seats or half-cells 413, 414 at the rear portion 402a, configured with transversal 415 and longitudinal 419 walls or ribs that hold the thermal units 431, 441 in position.

Figure 60:
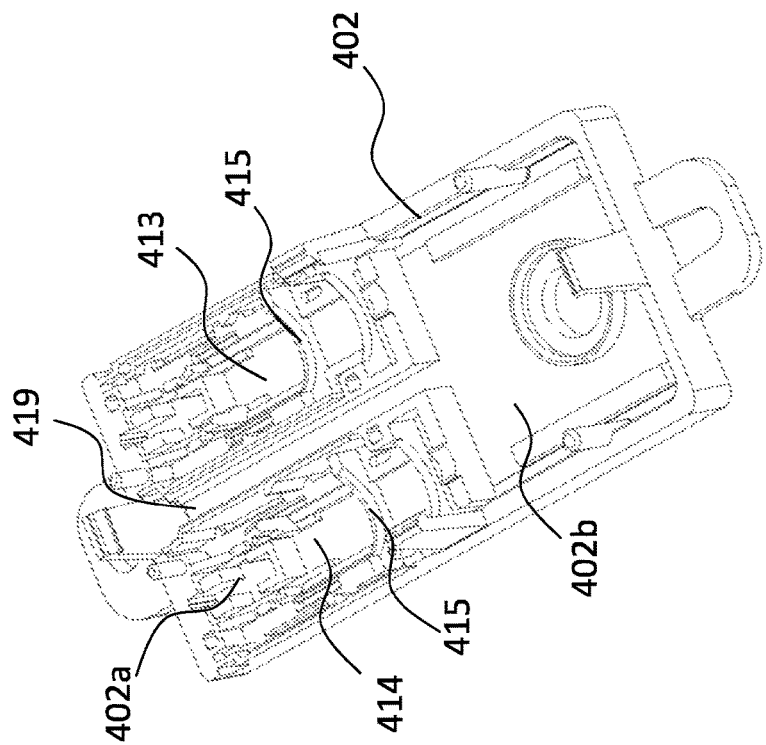
FIGS. 59 and 60 show respective details of the device of FIG. 55.
Figure 59:
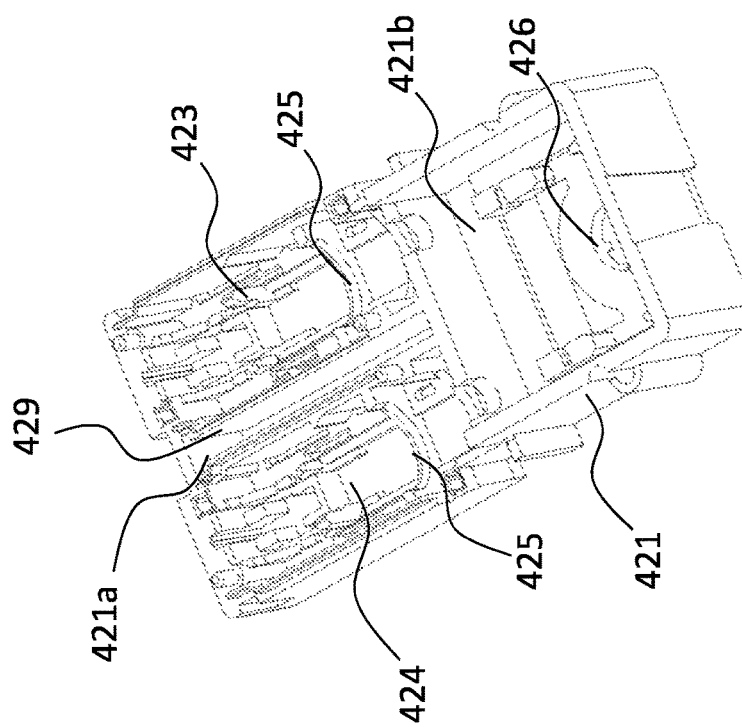
Figure 61:
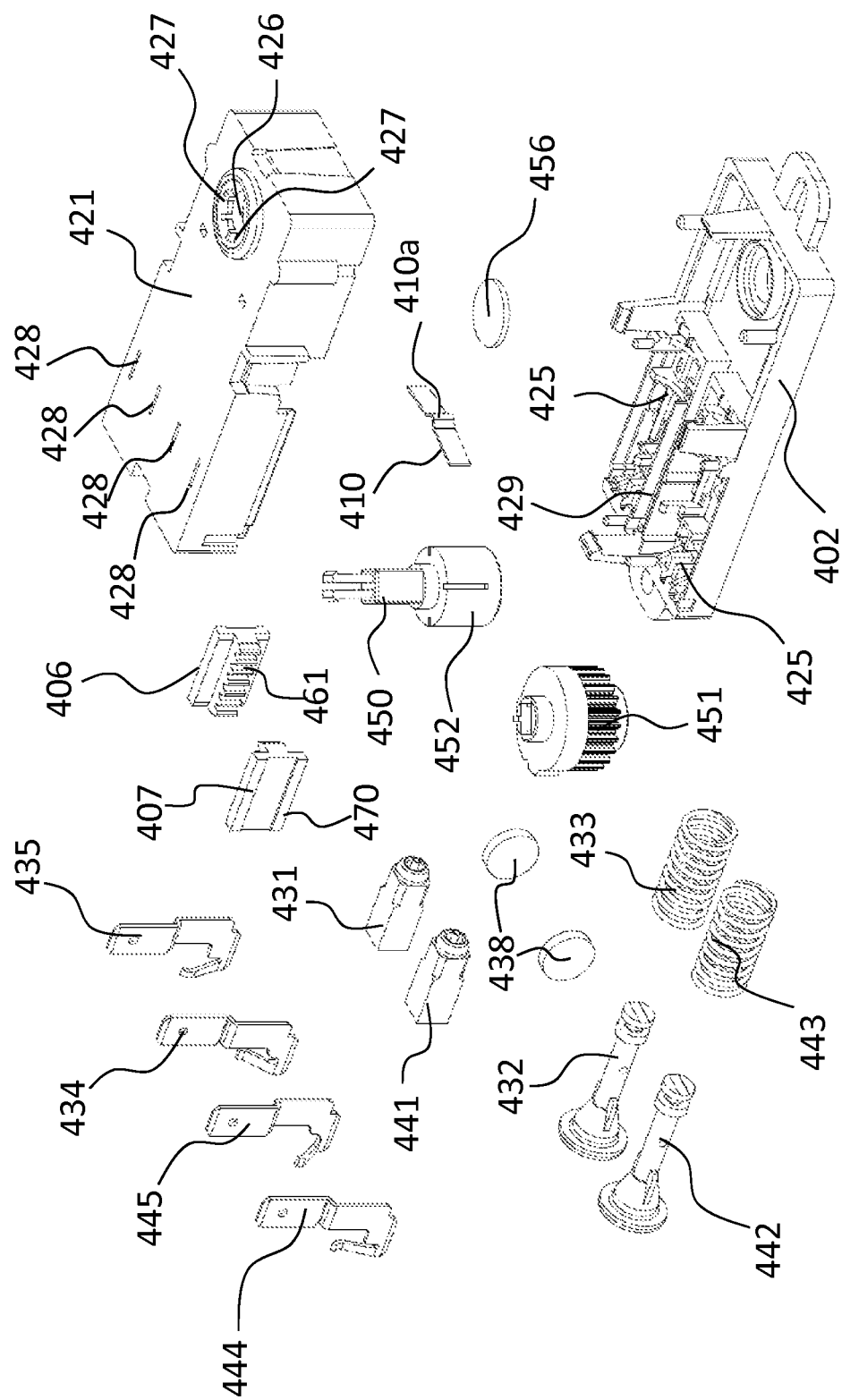
FIG. 61 is an exploded view of the device of FIG. 55.

As clearly shown in FIGS. 59, 60, also the cover 121 has similar seats or half-cells 423, 424 with transversal 425 and longitudinal 429 ribs, so that, when the cover 421 is closing the shell 402, the half-cells form the housings for the thermoactuators 403, 404, i.e., the housings for at least the respective thermal assemblies 431, 441 and/or the respective repositioning springs 433, 443 and/or the respective electric heaters or PTC resistors 438.

It should be noted that the cover 421 also extends over the rear part 402a of the housing 402, where there are the thermal assemblies 431 and 441, with apertures or slots 428 through which the electric terminals 433, 434, 443, 444 can pass; according to a variant not illustrated in the drawings, at least two electric terminals 434, 445 can be made as a single electric terminal contacting both thermal assemblies 431, 441, i.e., an electric terminal shared by at least two thermal assemblies 431, 441. Said at least one electric terminal 433, 444 is provided with elastic contact protuberances facing a respective one or both of the thermal assemblies 431, 441 arranged side by side, in particular with at least one electric terminal 433, 444 at least partly interposed between two adjacent surfaces, preferably flat and parallel to each other, of respective thermal assemblies 431, 441.

In accordance with a preferred embodiment, the thermal assemblies 431, 441 are arranged side by side and/or parallel to each other, and are shaped externally like a parallelepipedon, or include at least one flat side wall 437, 447.

This promotes the equally spaced arrangement of the electric terminals 434, 435, 444, 445; therefore, since in this example the thermal assemblies 431, 441 lack a respective single housing, which is replaced by the shell 402 and the cover 421 where they are housed, the distance between the two thermal assemblies 431, 441, which determines the distance between the terminals 434 and 445, is preferably predefined in a manner such that it equals the distance between the terminals 434 and 435; 444 and 445.

The latter are preferably of the flat type, their width being in the range of 6.1 to 6.5 mm, substantially equal or close to 6.3 mm, and their thickness being in the range of 0.6 mm to 1 mm, preferably equal or close to 0.8 mm; the pitch between the terminals 434, 435, 444, 445 is in the range of 9 to 11 mm, preferably equal or close to 10 mm.

To this end, the transversal 415 or longitudinal 419 walls or ribs of the shell 402, as well as the corresponding ones 425, 429 of the cover 421, ensure that the thermal assemblies 431, 441 will be positioned at such a distance that the electric terminals 434, 435, 444, 445 will be equally spaced by a predetermined pitch, thus creating a single electric connector of the device; this features offers the advantage that the device 1 can be connected to a single complementary connector, i.e., having the same pitch, of the external wiring of the user apparatus.

Preferably, the electric connector of the device 1 comprises also engagement means and/or coding means and/or positioning and/or orientation means for ensuring a single and/or oriented fitting and/or coupling to a respective electric connector of the wiring, in particular for the purpose of avoiding wrong connections to other connectors and/or electric connections.

For the remaining part, this variant embodiment of the device is equal or similar to the one previously described, with a transmission member, i.e., the pinion 405, which is driven by the thermoactuators 403, 404 through another transmission member, i.e., the pair of racks 406, 407.

The pinion 405 comprises the central pin 450 with the base 452, the toothed wheel 451 and the disk 454 with cutouts 455', 455", just like the preceding one, and therefore, for brevity, reference should be made to the above description for further details; the same is true as regards the operation of this variant of the invention, which is similar to the preceding case and will not be described any further; again, reference should be made to the above description for further details.

As can be easily understood, this variant of the device according to the invention is even more compact than the preceding one, in that the single housings for the thermoactuators have been eliminated, being at least partly provided as one piece and/or integrated into a new housing 402, 421, in particular comprising a shell 402 and a cover 421, with the thermal units 431, 441 directly mounted inside the shell 402 and/or the cover 421.

In accordance with a preferred embodiment of the invention, the housing defined by the shell 402 together with the cover 421 also accommodates the stems 432, 442 associated with the thermal assemblies 431, 441, as well as the elastic return coil springs 433, 443 and the electric heaters 438 or PTC resistors, plus the racks 406, 407, the pinion 405 with the toothed wheel 451 and the pin 450, and the stopping means 410, 455', 455" of the latter.

As can be easily understood, this provides protection for the entire mechanism of the device according to the invention, with apparent advantages in terms of reliability and safety, since the risk that a person might be injured by the movable parts of the mechanism is eliminated or at least reduced.

In this context, it must be taken into account that further variants are also possible as concerns the operation of some elements of the device.

For example, the actuators may be of the bimetal or shape-memory alloy type, and may be associated with heaters conceptually similar to those already described (resistors or PTC resistors), or they may be heated individually in a different way, e.g., by circulating an electric current directly in the electrothermal element, such as a shape-memory alloy wire.

The latter will contract when heated, thus pulling a respective rack (e.g., the wire being connected to the rack and to the housing), possibly with the addition of an elastic return element or spring.

In the bimetal case, it may be a leaf-spring element which changes its curvature when its temperature rises, and which is adapted to transform said curvature variation into linear motion for translating the rack, etc.; for example, a rack resting on the intermediate point of the leaf spring.

Finally, it must be pointed out that, although in the above-described examples and variants reference has been made to actuator devices producing rotary motion, the principles of the invention are also applicable to devices producing a different type of motion, e.g., angular motion.

Let us think, for example, of a slider being alternately driven by the movements of at least one of the racks controlled by at least one of the thermoactuators discussed above.

All these possible solutions, just like the preceding ones, fall within the scope of the following claims, the text of which is an integral part of the present description.

They may find application in household appliances and/or environmental conditioning and heating apparatuses and/or vehicles and/or automatic devices in general; for example, for controlling the position of flaps or valves with rotary obstructors, etc.

What is claimed is:

1. An actuator device comprising at least:
   a first transmission member which is substantially linearly slidable or movable, the first transmission member comprising one of a rack or a sliding gear;
   a second transmission member cooperating with the first transmission member and comprising one of a pinion, a toothed wheel, or an angularly-movable gear which engages with the rack or sliding gear, the second transmission member being rotatable or angularly movable between at least two operating conditions;
   a thermal assembly, which when electrically activated moves at least one of said first transmission member and said second transmission member;
   said first transmission member and said second transmission member mutually cooperate to transmit motion from the first transmission member to the second transmission member between at least said two operating conditions;
   releasable engagement means associated with at least one of said first member and second member and configured to hold at least one of said first transmission member and said second transmission member in at least two stable conditions.

2. The device according to claim 1, wherein the motion of said second transmission member is of the rotary type, and wherein the releasable engagement means cooperate therewith to hold said second transmission member in at least one of said stable conditions.

3. The device according to claim 1, comprising an outer housing that houses at least a part of said first transmission member and/or said second transmission member, wherein the releasable engagement means:
   cooperate with the outer housing to hold at least one of said first transmission member and said second transmission member in at least one of said stable conditions;
   are at least partly made or integrated into the outer housing;
   include one or more of the following housing parts:
      grooves, cam profiles, engagement seats, guides, apertures and/or holes, or element fastening means.

4. The device according to claim 1, wherein the releasable engagement means comprise a hook-shaped element associated or integral with the first transmission member and slidably guided along a path or a groove or a cam on the housing, wherein the hook-shaped element is preferably flexible or associated in a substantially articulated manner with the first member.

5. The device according to claim 1, wherein the releasable engagement means comprise a substantially oscillating or floating or horizontally-pivoted hooking element, which is adapted to engage with said first transmission member and/or with a housing.

6. The device according to claim 5, wherein said substantially oscillating or floating or horizontally-pivoted hooking element comprises one or more of the following:
   protrusions and surfaces, adapted to engage with said first transmission member and/or with an outer housing to hold said first transmission member and/or said second transmission member in at least one of said stable conditions,
   wherein said first transmission member comprises one or more surfaces, cavities, and protrusions, which are adapted to engage or cooperate with said substantially oscillating or floating or horizontally-pivoted hooking element and/or with the outer housing to hold said first transmission member and/or said second transmission member in at least one of said stable conditions.

7. The device according to claim 5, further comprising an elastic connection element between said substantially oscillating or floating or horizontally-pivoted hooking element and said first transmission member.

8. The device according to claim 1, wherein the releasable engagement means comprise a rotary hooking element associated and/or cooperating with guides and/or couplings or similar elements associated with or integrated into said first transmission member.

9. The device according to claim 8, wherein the releasable engagement means comprise at least one of:
   a pin or means for associating a head with said housing;
   means adapted to cause the rotary element to cooperate with the guides and/or couplings, and/or
   wherein the rotary element comprises seats or cutouts arranged at the periphery of the rotary head to cooperate with the guides and/or couplings.

10. The device according to claim 1, further comprising at least two thermal assemblies or thermal and/or electrothermal actuators.

11. The device according to claim 1, further comprising a housing, wherein the housing comprises a shell which is at least partly closed by a cover, and which houses said at least one thermal assembly.

12. The device according to claim 1, further comprising a housing, wherein the housing comprises a shell which is at least partly closed by a cover, and which houses said at least one thermal assembly and at least a part of at least one of said first and second transmission members, wherein the housing comprises means for detecting a position of said first or second transmission member,
   and at least one of:
   a transparent insert adapted to allow visibility inside the housing; or
   means or references visible from the outside of the housing.

13. The device according to claim 1, further comprising a housing, wherein the housing comprises elements or seats for housing or positioning the at least one thermal assembly, and/or comprises guides and/or seats for at least one of said first and second transmission members.

14. The device according to claim 1, wherein said thermal assembly comprises a thermal actuator or an electrothermal linear actuator.

15. The device according to claim 1, wherein said thermal assembly is configured to hold at least one of the first transmission member and the second transmission member in the at least two stable conditions while de-energized.

16. The device according to claim 1, wherein the at least two stable conditions include a first condition and a second condition,
   wherein the thermal assembly is energized to move the first transmission member and the second transmission member from the first condition to the second condition and is de-energized afterwards such that the releasable engagement means holds the actuator in the second condition, and
   wherein the thermal assembly is energized to move the first transmission member and the second transmission member from the second condition to the first condition and is de-energized afterwards such that the releasable engagement means holds the actuator in the first condition.

17. The device according to claim 1, wherein the thermal assembly when electrically activated moves from a contracted state to an extended state and when electrically deactivated automatically rebounds from the extended state back to the contracted state unless restrained in the extended state.

18. The device according to claim 17, wherein the first transmission member and the second transmission member are each movable between a respective first operating condition and a spaced apart second operating condition and wherein the thermal assembly, first transmission member and the second transmission member cooperating together so that:
   when the thermal assembly is a first time electrically activated and then a first time electrically deactivated, the thermal assembly moves the first transmission member and the second transmission member to their respective first operating conditions with the releasable engagement means holding at least the first transmission member or the second transmission member in a first of the two stable conditions; and
   when the thermal assembly is a second time electrically activated and then a second time electrically deactivated, the thermal assembly moves the first transmission member and the second transmission member to their respective second operating conditions with the releasable engagement means holding at least the first transmission member or the second transmission member in a second of the two stable conditions.

19. The device according to claim 18, wherein the thermal assembly, first transmission member and the second transmission member cooperating together so that when the thermal assembly is a third time electrically activated and then a third time electrically deactivated, the thermal assembly moves the first transmission member and the second transmission member back to their respective first operating conditions with the releasable engagement means holding at least the first transmission member or the second transmission member in the first of the two stable conditions.

20. An actuator device comprising at least:
   a first transmission member which is substantially linearly slidable or movable between a first operating position and a second operating position;
   a second transmission member which is rotatable or angularly movable between a first operating position and a second operating position, the first transmission member and the second transmission member cooperating together so that when one of the first or second transmission members is moved to the their first or second operating position, the other of the first or second transmission members is also moved to their first or second operating position;
   a thermal assembly which when electrically activated moves from a contracted state to an extended state and when electrically deactivated automatically rebounds from the extended state back to the contracted state unless restrained in the extended state;
   the thermal assembly, first transmission member and the third transmission member cooperating together so that:
      when the thermal assembly is a first time electrically activated and then a first time electrically deactivated, the thermal assembly moves the first transmission member and the second transmission member to their respective first operating positions, a releasable restraint restraining at least the first transmission member or the second transmission member in their respective first operating positions; and
      when the thermal assembly is a second time electrically activated and then a second time electrically deactivated, the thermal assembly moves the first transmission member and the second transmission member to their respective second operating positions.

21. The actuator device according to claim 20, wherein the releasable restraint restrains the thermal assembly at least partially in its extended state when the thermal assembly is first time electrically deactivated.

22. The actuator device according to claim 20, wherein the thermal assembly, first transmission member and the third transmission member cooperating together so that when the thermal assembly is a third time electrically activated and then a third time electrically deactivated, the thermal assembly moves the first transmission member and the second transmission member back to their respective first operating positions, and the releasable restraint again restrains at least the first transmission member or the second transmission member in their respective first operating positions.

* * * * *